US012722265B2

(12) United States Patent
Ueda et al.

(10) Patent No.: US 12,722,265 B2
(45) Date of Patent: Sep. 1, 2026

(54) WORKING MACHINE

(71) Applicant: Koki Holdings Co., Ltd., Tokyo (JP)

(72) Inventors: Takashi Ueda, Ibaraki (JP); Shota Ueno, Ibaraki (JP); Takahiro Hirai, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 19/149,165

(22) PCT Filed: Dec. 22, 2023

(86) PCT No.: PCT/JP2023/046126
§ 371 (c)(1),
(2) Date: Jul. 18, 2025

(87) PCT Pub. No.: WO2024/154539
PCT Pub. Date: Jul. 25, 2024

(65) Prior Publication Data

US 2026/0225214 A1 Aug. 6, 2026

(30) Foreign Application Priority Data

Jan. 19, 2023 (JP) ................................ 2023-006683
May 31, 2023 (JP) ................................ 2023-090407

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ................................. B25C 1/047; B25C 1/06
See application file for complete search history.

(56) References Cited

U.S. PATENT DOCUMENTS

2018/0154505 A1* 6/2018 Sato .......................... B25C 1/06
2021/0138622 A1* 5/2021 Enta ......................... B25C 1/047
2022/0097219 A1* 3/2022 Kuriki ....................... B25C 1/06
2022/0126431 A1* 4/2022 Ootsuka .................... B25C 1/06

FOREIGN PATENT DOCUMENTS

JP 2021154470 A 10/2021
WO 2018180082 A1 4/2018

* cited by examiner

*Primary Examiner* — Nathaniel C Chukwurah
(74) *Attorney, Agent, or Firm* — NovoTechIP International PLLC

(57) ABSTRACT

An object of the present invention is to improve convenience of a working machine. The striking machine includes an electric motor, a driver blade 16 capable of striking a fastener, and a pin wheel 50 that rotates by a driving force of the electric motor. The driver blade 16 includes a plurality of racks 61 to 70. The pin wheel 50 includes winding pins 51 to 60 that engage with the racks 61 to 70 in the striking operation of the driver blade 16, and an interference portion that does not interfere with a striking portion 6 in a first striking operation in which all of the racks 61 to 70 engage with the winding pins 51 to 60 and that interferes with the striking portion 6 in a second striking operation in which a part of the racks 61 to 70 does not engage with the winding pins 51 to 60.

17 Claims, 28 Drawing Sheets

6 : STRIKING PORTION
16 : DRIVER BLADE
50 : PIN WHEEL (ROTATING PORTION)
51～60 : WINDING PINS (ROTATING PORTION SIDE ENGAGEMENT PORTIONS)
61～70 : RACKS (STRIKING PORTION SIDE ENGAGEMENT PORTIONS)

(a)

(b)

(a)

(b)

(a)

(b)

WORKING MACHINE

TECHNICAL FIELD

The present invention relates to a working machine such as a striking machine.

BACKGROUND ART

As an example of a working machine, a striking machine including a driver blade that strikes a fastener, a pin wheel that pushes up the driver blade, and a motor that rotates the pin wheel is known.

As a striking machine as described above, for example, Patent Document 1 discloses a striking machine including a mechanism in which a rack provided on a driver blade and a pin provided on a pin wheel are engaged with each other, and after striking, the driver blade is pushed up by rotation of the pin wheel.

RELATED ART DOCUMENT

Patent Document

International Publication No. 2018-180082

SUMMARY OF THE INVENTION

Problems to be Solved by the Invention

In the striking machine described in Patent Document 1 described above, pins and racks are provided in the same number so as to correspond to each other, and when the pin wheel rotates in a state where the pins and the racks are engaged with each other, the driver blade is pushed upward.

In such a striking machine, when a nail (fastener) becomes jammed in the ejection port or when a large load is applied to the driver blade when a hard struck material and the driver blade does not reach a normal stop position within a predetermined time, there is a possibility that misalignment occurs when the pin of the pin wheel is engaged with the rack of the driver blade again after striking.

When misalignment occurs in the engagement between the pin and the rack, the pin of the pin wheel is left with respect to the rack of the driver blade, and the rack of the driver blade accelerated by the compression energy of the pressure accumulator collides with the remaining pin after the engagement between the lowermost rack on the driver blade and the pin is released. When the rack of the driver blade collides with the remaining pin, a load is applied to the pin wheel in a direction opposite to the rotational direction when the driver blade is pushed up.

A speed reduction mechanism that decelerates and transmits the driving force of the motor is connected to the pin wheel. The speed reduction mechanism includes a one-way clutch mechanism that prevents rotation (reverse rotation) of the pin wheel in a direction opposite to rotation (forward rotation) of the pin wheel in a direction in which the driver blade is pushed up.

Therefore, when the final rack of the driver blade and the pin collide with each other and a load is applied to the pin wheel in such a direction as to promote reverse rotation, a large load is also applied to the speed reduction mechanism, and the speed reduction mechanism may be damaged. Furthermore, collision between the final rack of the driver blade and the pin may damage the driver blade and the pin. When the speed reduction mechanism, the driver blade, or the pin is damaged as described above, work on the striking machine is interrupted, further, the striking machine is required to be brought to a repair shop for repairs such as replacing parts, and there is a possibility that convenience of the striking machine for a user is impaired.

An object of the present invention is to provide a working machine with improved convenience.

Means for Solving the Problems

A working machine according to the present invention includes: a motor; a striking portion capable of striking a fastener by moving to one side in a first direction; a biasing portion that biases the striking portion to one side in the first direction; a rotating portion that rotates by a driving force of the motor and is engageable with and disengageable from the striking portion; and a control unit that controls driving of the motor, in which the striking portion includes a plurality of striking portion side engagement portions provided along the first direction, moves from a standby position to the other side in the first direction when the rotating portion rotates in a state of being engaged with the striking portion, and performs a striking operation of moving to one side in the first direction by a biasing force of the biasing portion to strike the fastener when the engagement with the rotating portion is released, and the rotating portion includes a plurality of rotating portion side engagement portions provided along a rotational direction of the rotating portion and that engage with the plurality of striking portion side engagement portions in the striking operation, and an interference portion that does not interfere with the striking portion in a first striking operation in which all of the plurality of striking portion side engagement portions are engaged with the rotating portion side engagement portions and that interferes with the striking portion in a second striking operation in which some of the plurality of striking portion side engagement portions are not engaged with the rotating portion side engagement portions.

Effects of the Invention

According to the present invention, the convenience of the working machine can be improved.

BRIEF DESCRIPTIONS OF THE DRAWINGS

Figure 9:
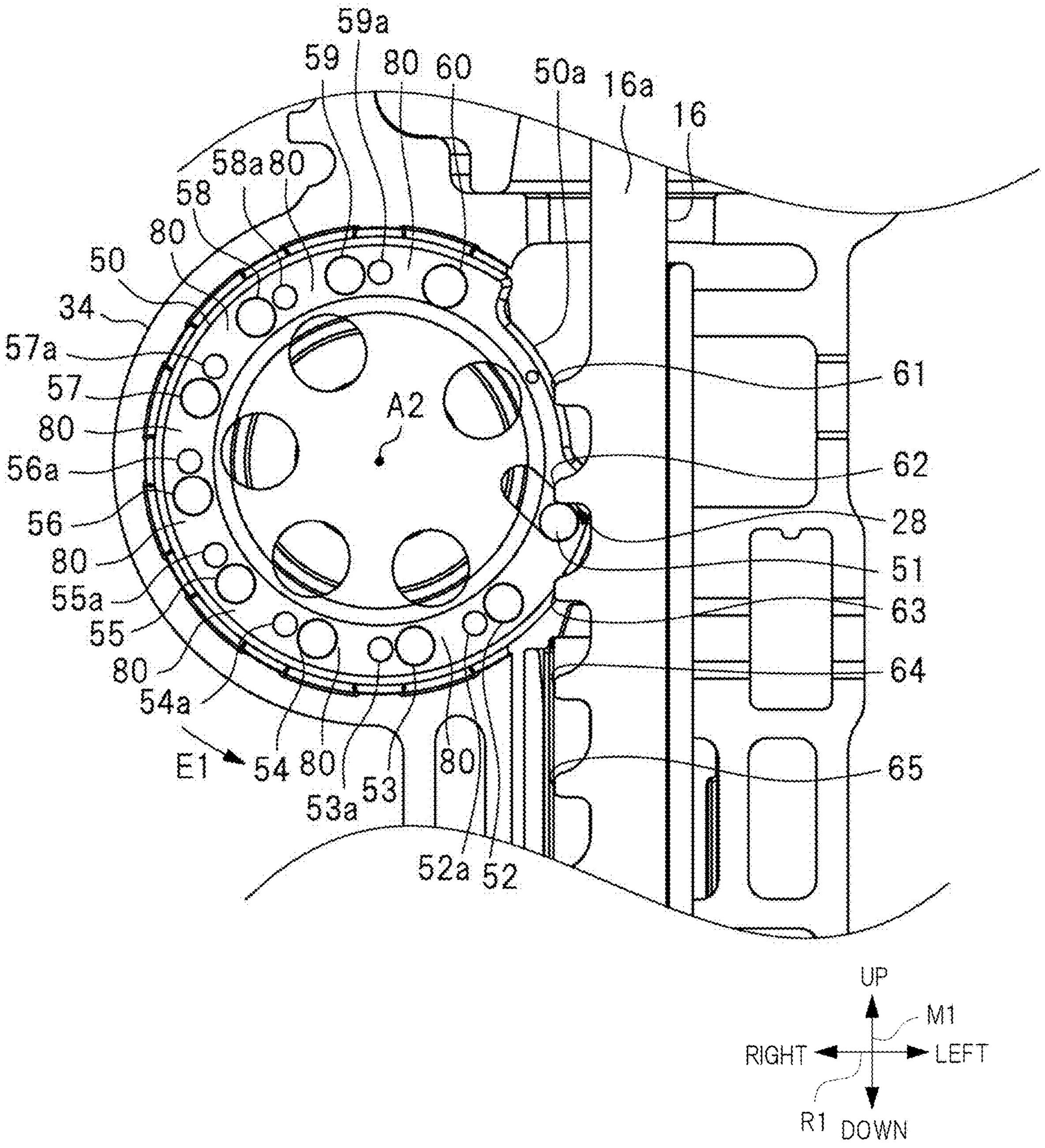
FIG. 9 is a partially enlarged view illustrating an engagement state between a rack and a pin at the start of winding in an example of a winding operation (one-step misalignment operation) at the time of occurrence of a misalignment of the working machine in FIG. 1.
Figure 11:
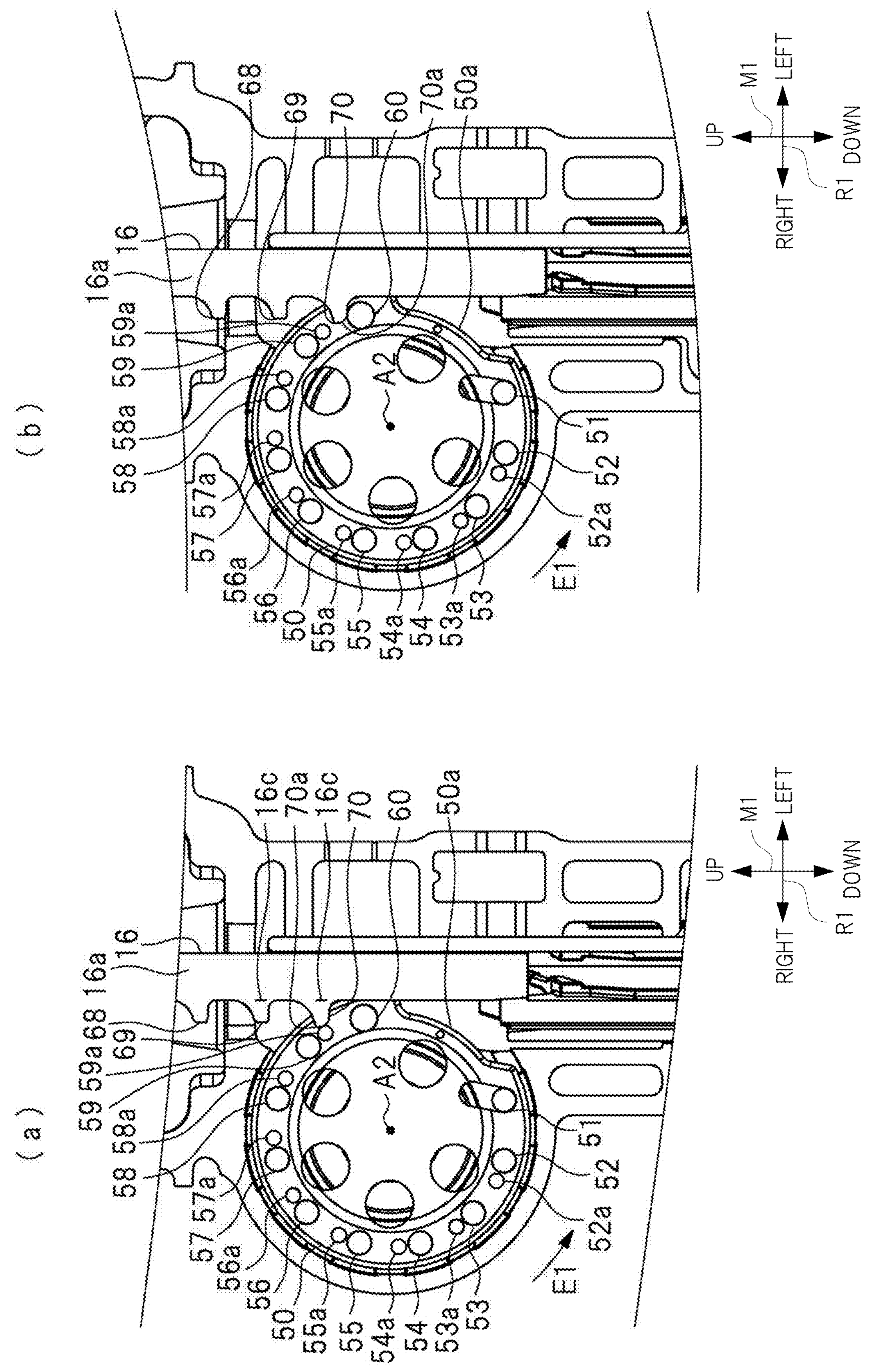

FIG. 11 is a partially enlarged view illustrating an engagement state between the rack and the pin in the winding operation when the misalignment occurs in FIG. 9, in which FIG. 11(*a*) illustrates a state at the time of driver blade release after a first collision, and FIG. 11(*b*) illustrates a state at the time of a second collision in which a final rack collides with the winding pin after the first collision.

Figure 12:
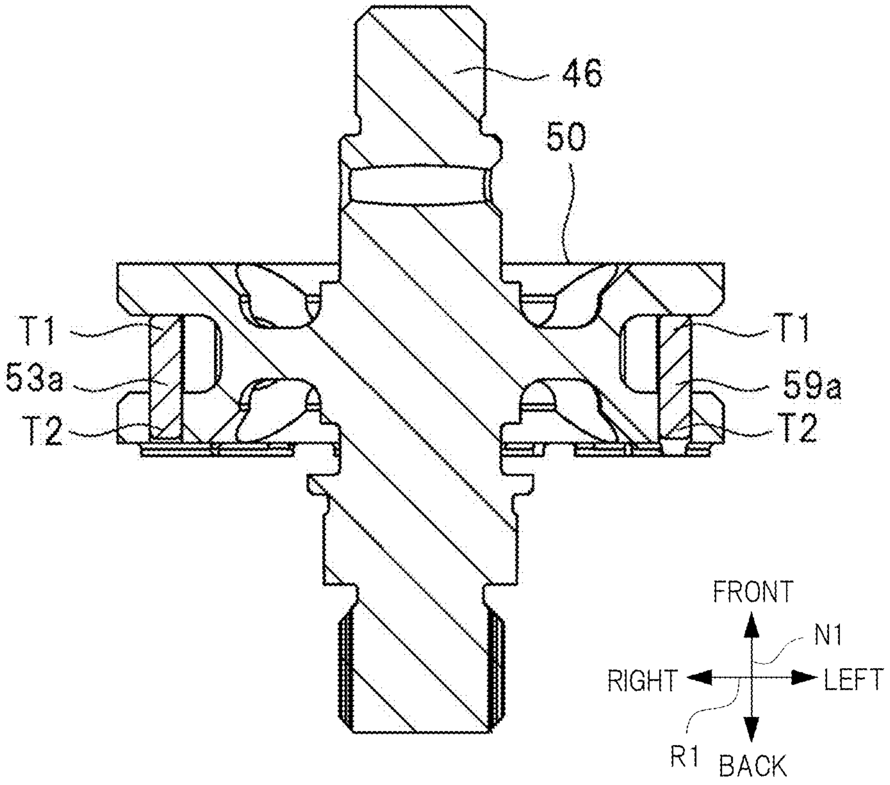

FIG. 12 is a cross-sectional view illustrating a structure of a pin wheel according to a first modification of the working machine of the first embodiment.

Figure 13:
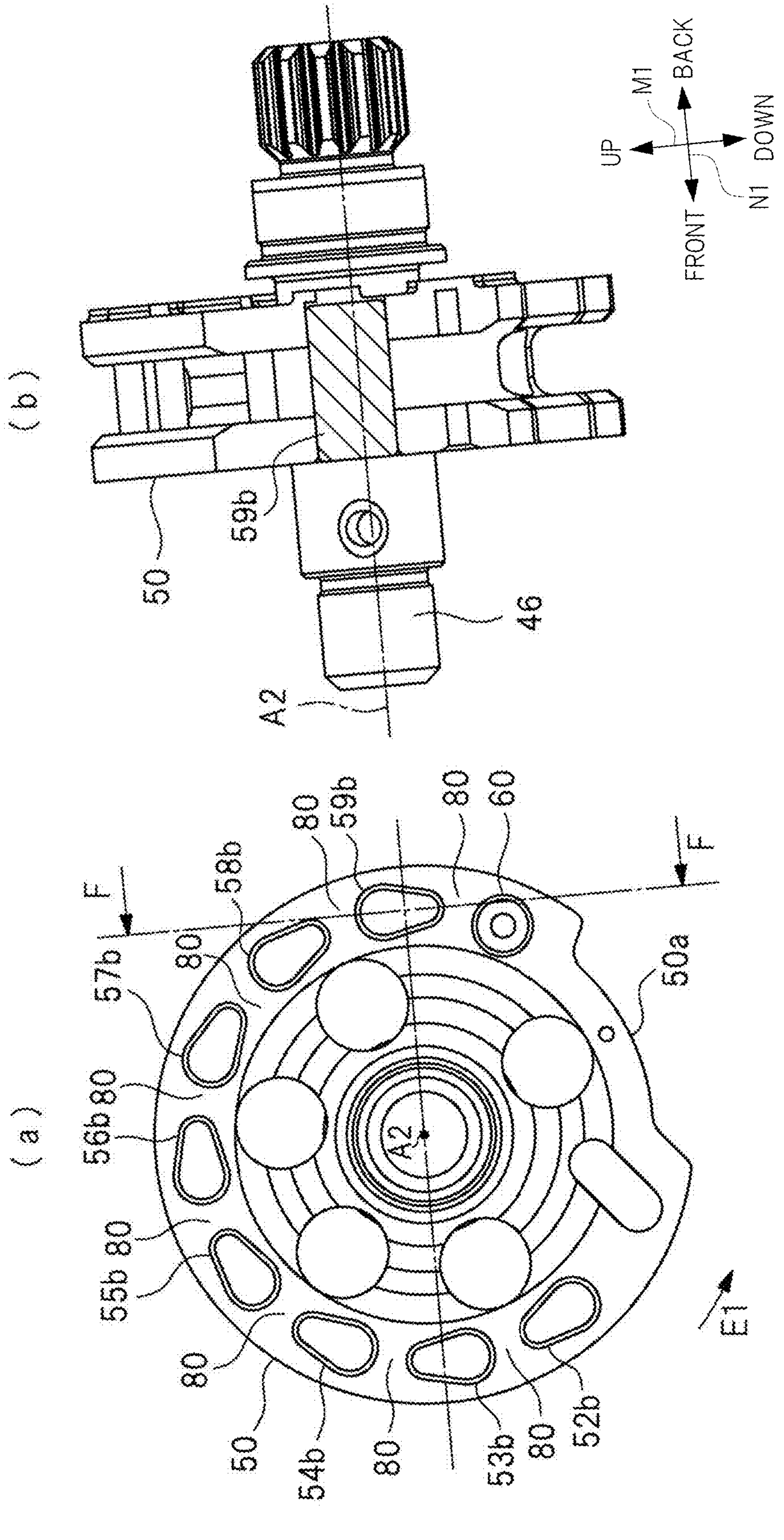

FIG. 13 is a view illustrating a structure of a pin wheel of a second modification in the working machine of the first embodiment, in which FIG. 13(*a*) is an external view and FIG. 13(*b*) is a cross-sectional view taken along line F-F of FIG. 13(*a*).

Figure 14:
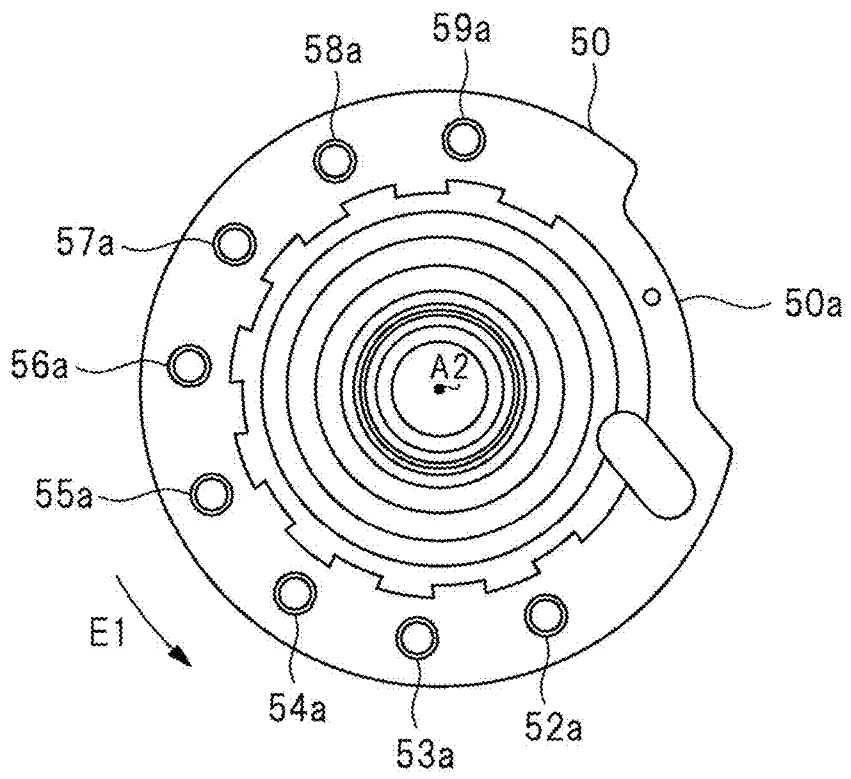
Figure 14:
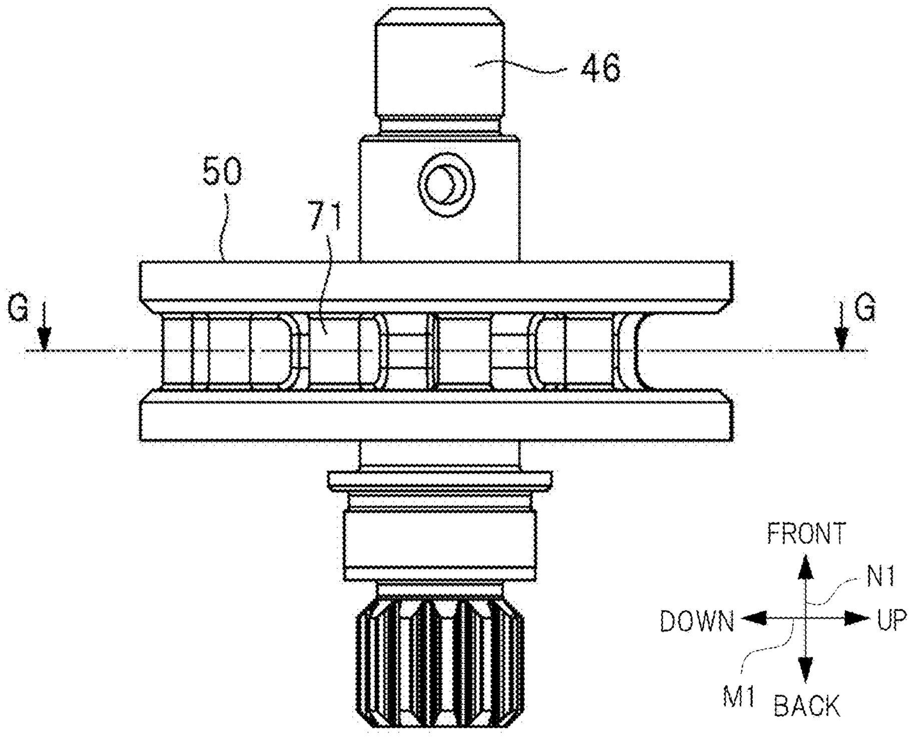

FIG. 14 is a view illustrating a structure of a pin wheel of a third modification in the working machine of the first embodiment, in which FIG. 14(*a*) is an external view and FIG. 14(*b*) is an external view of the pin wheel of FIG. 14(*a*) as viewed from the side.

Figure 15:
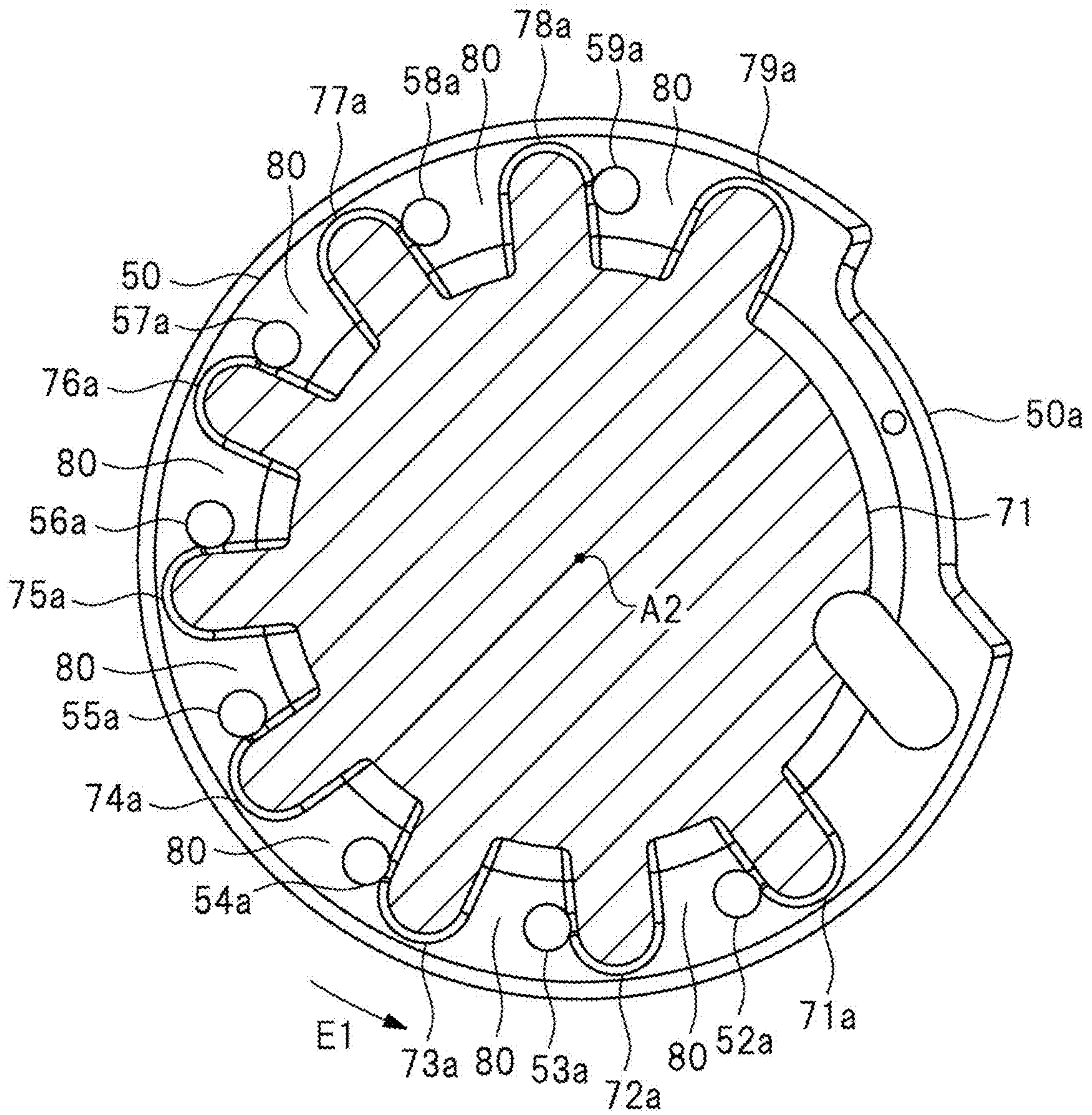

FIG. 15 is a cross-sectional view taken along line G-G in FIG. 14(*b*).

Figure 16:
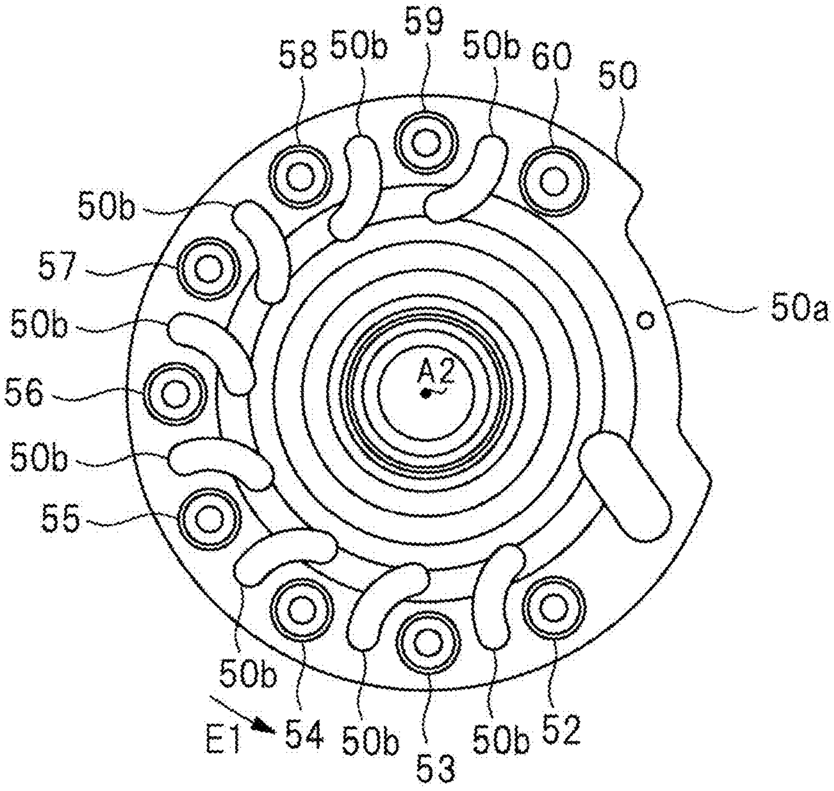
Figure 16:
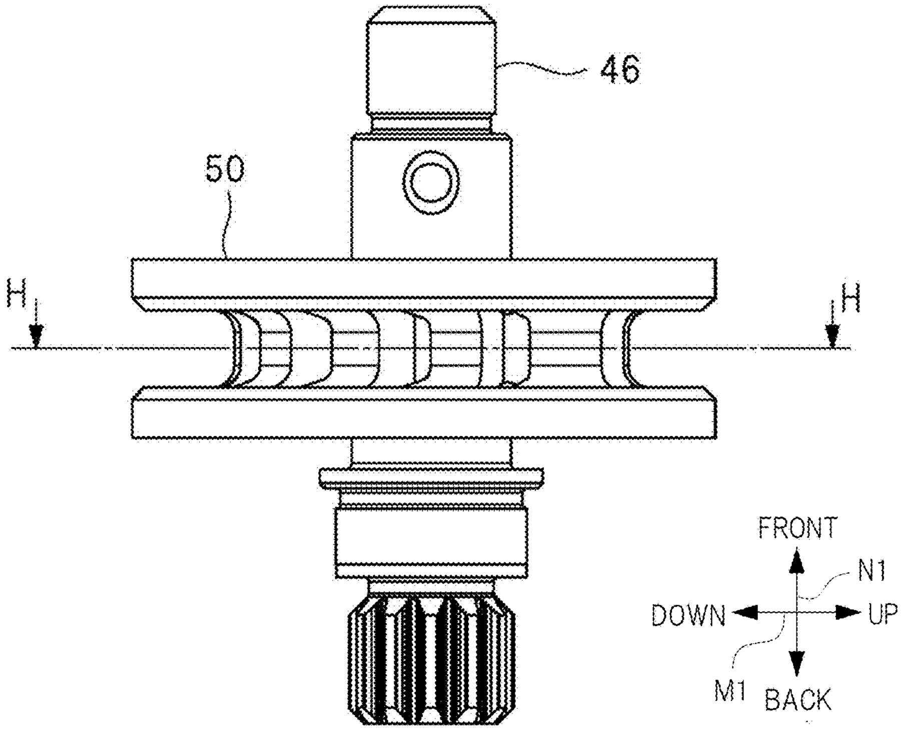

FIG. 16 is a view illustrating a structure of a pin wheel of a fourth modification in the working machine of the first embodiment, in which FIG. 16(*a*) is an external view and FIG. 16(*b*) is an external view of the pin wheel of FIG. 16(*a*) as viewed from the side.

Figure 17:
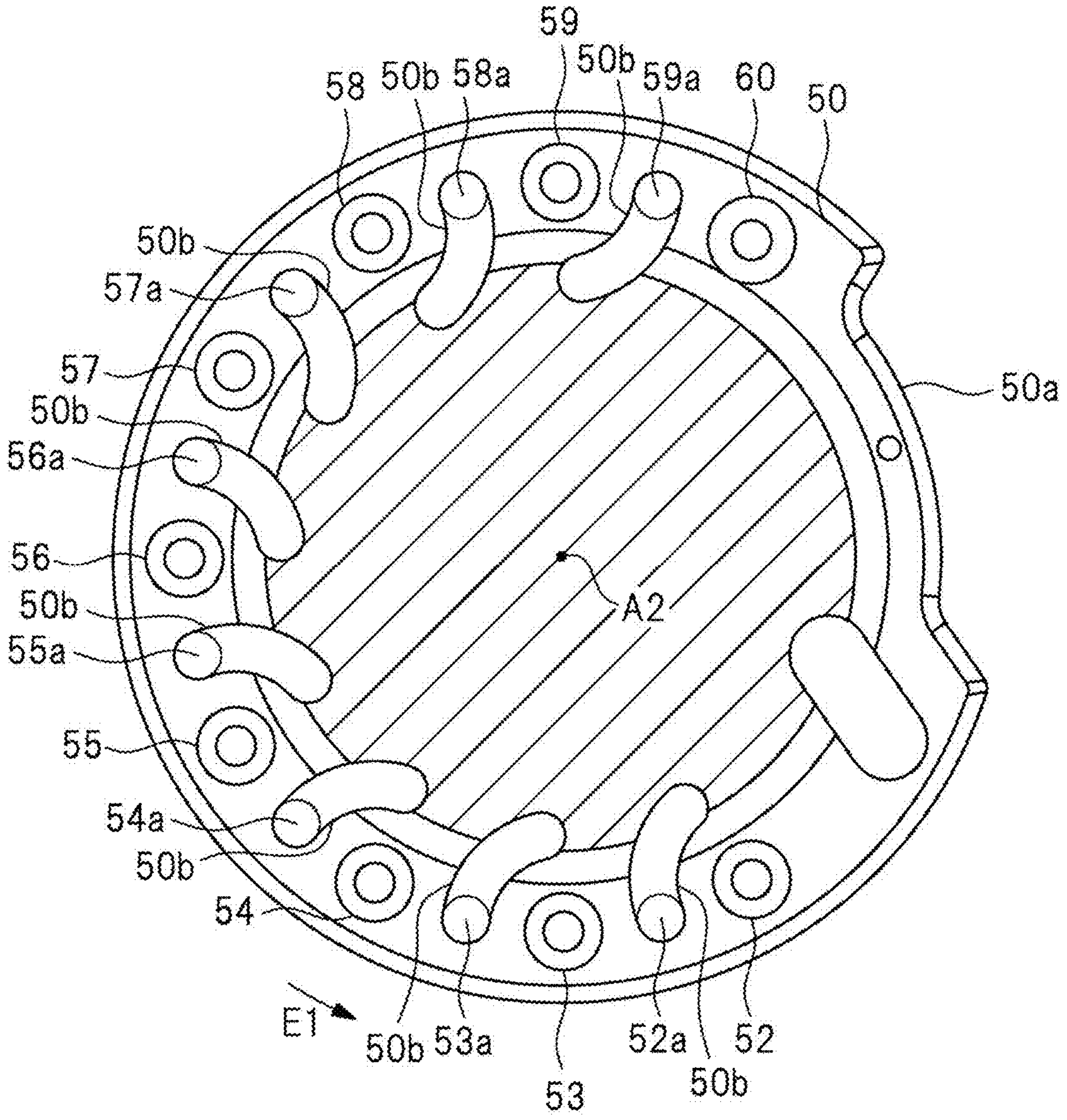

FIG. 17 is a cross-sectional view taken along line H-H in FIG. 16(*b*).

Figure 18:
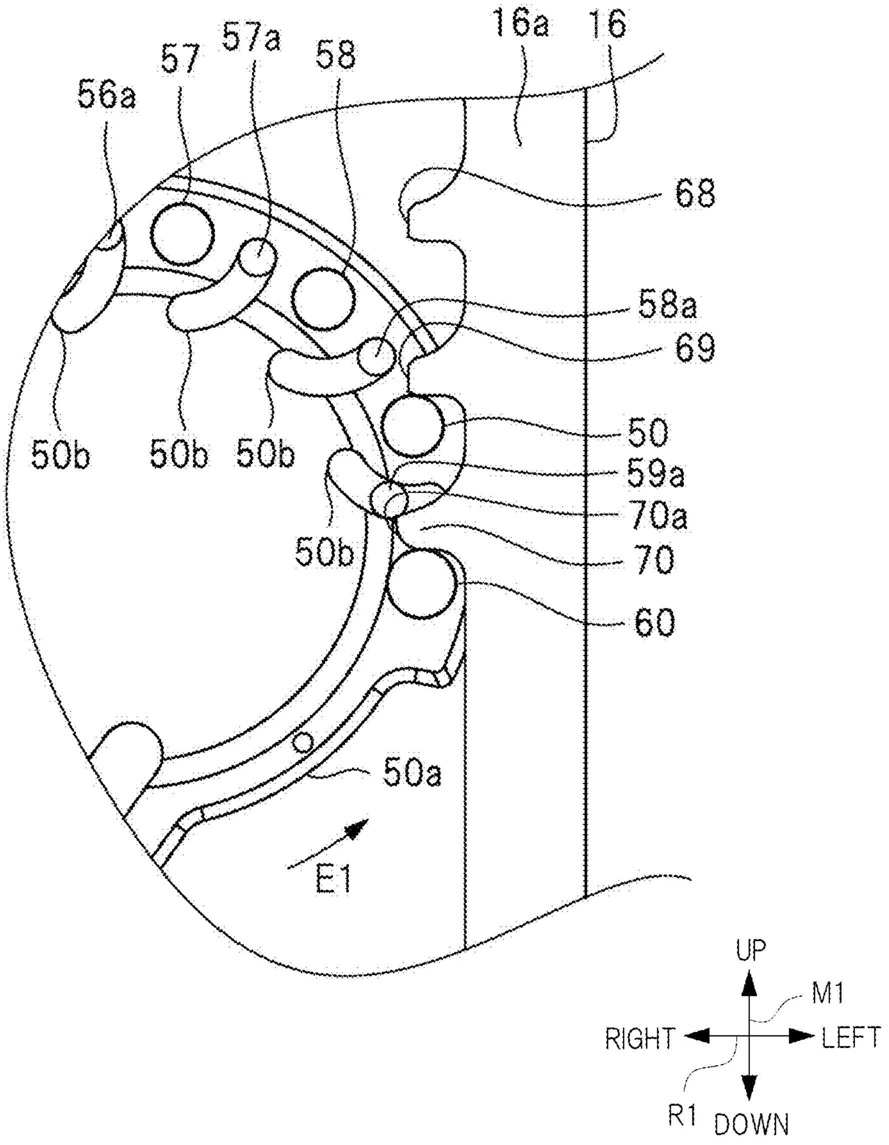

FIG. 18 is a partially enlarged view illustrating a state in which the rack of the driver blade and the abutment pin of the pin wheel are engaged with each other in the pin wheel of FIG. 16.

Figure 19:
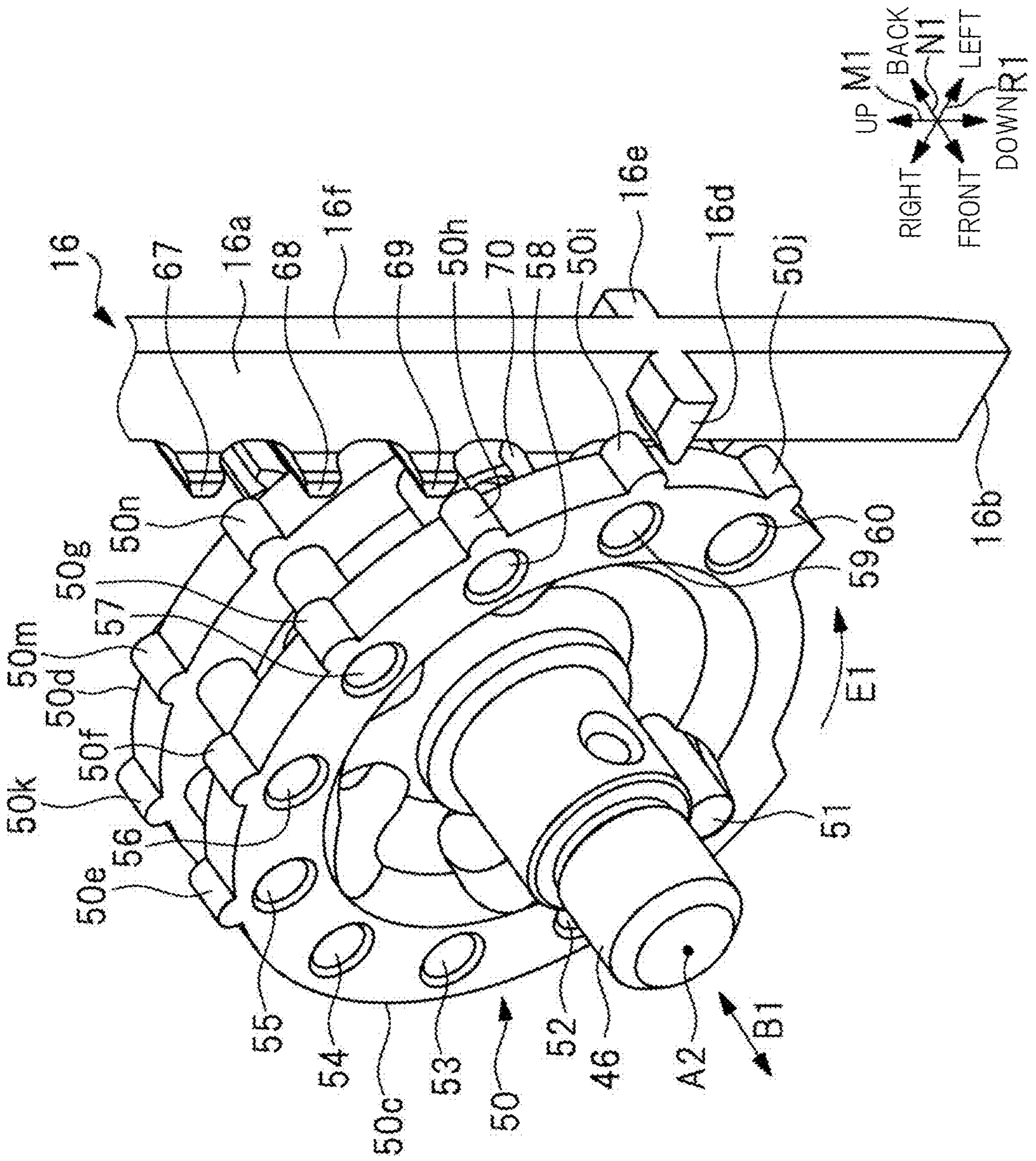

FIG. 19 is a partial perspective view illustrating an engagement state between the pin wheel and the driver blade in the working machine according to a second embodiment of the present invention.

Figure 20:
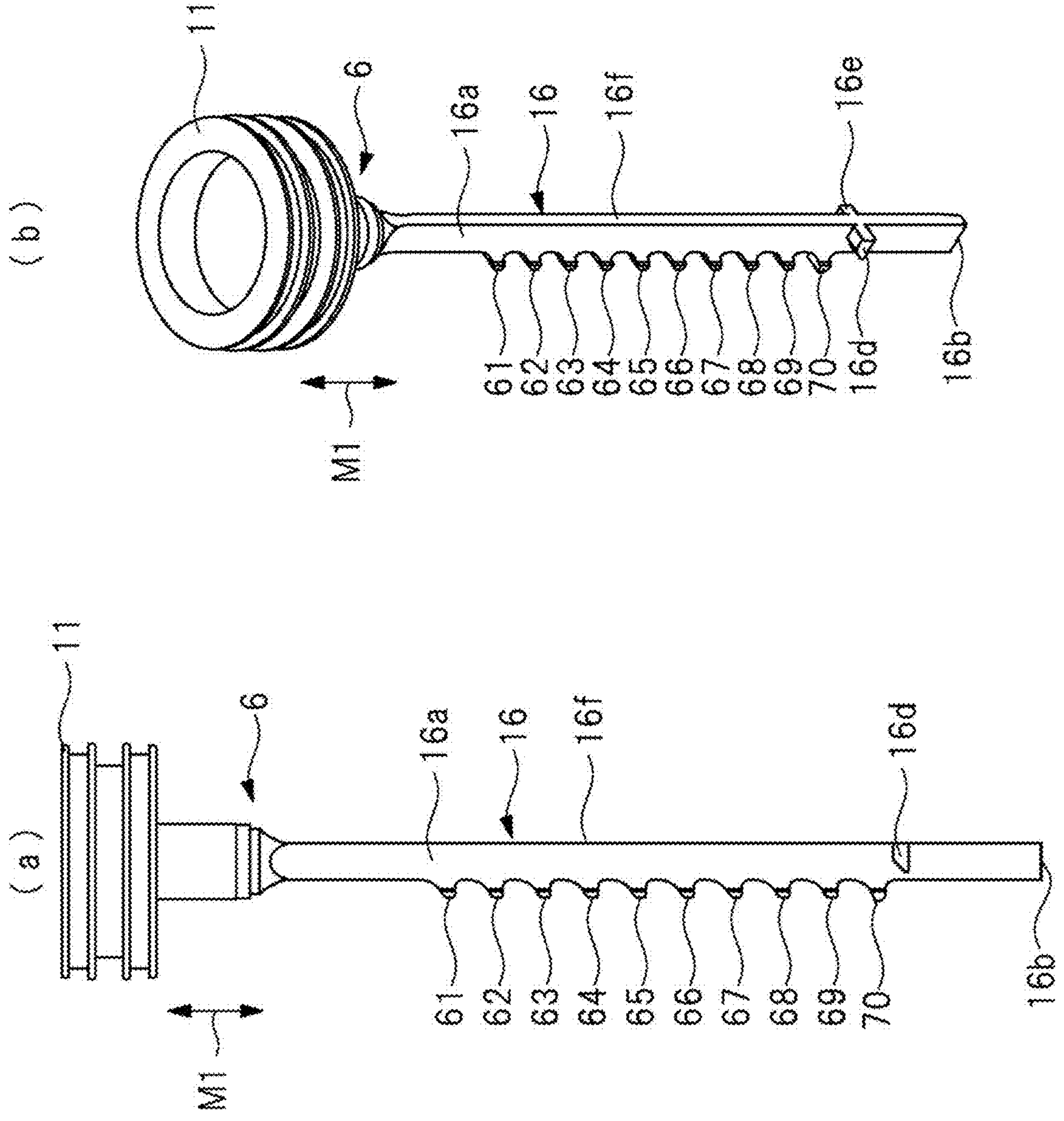

FIG. 20 is a view illustrating a structure of a driver blade and a piston in a working machine according to the second embodiment of the present invention, in which FIG. 20(*a*) is a side view and FIG. 20(*b*) is a perspective view.

Figure 21:
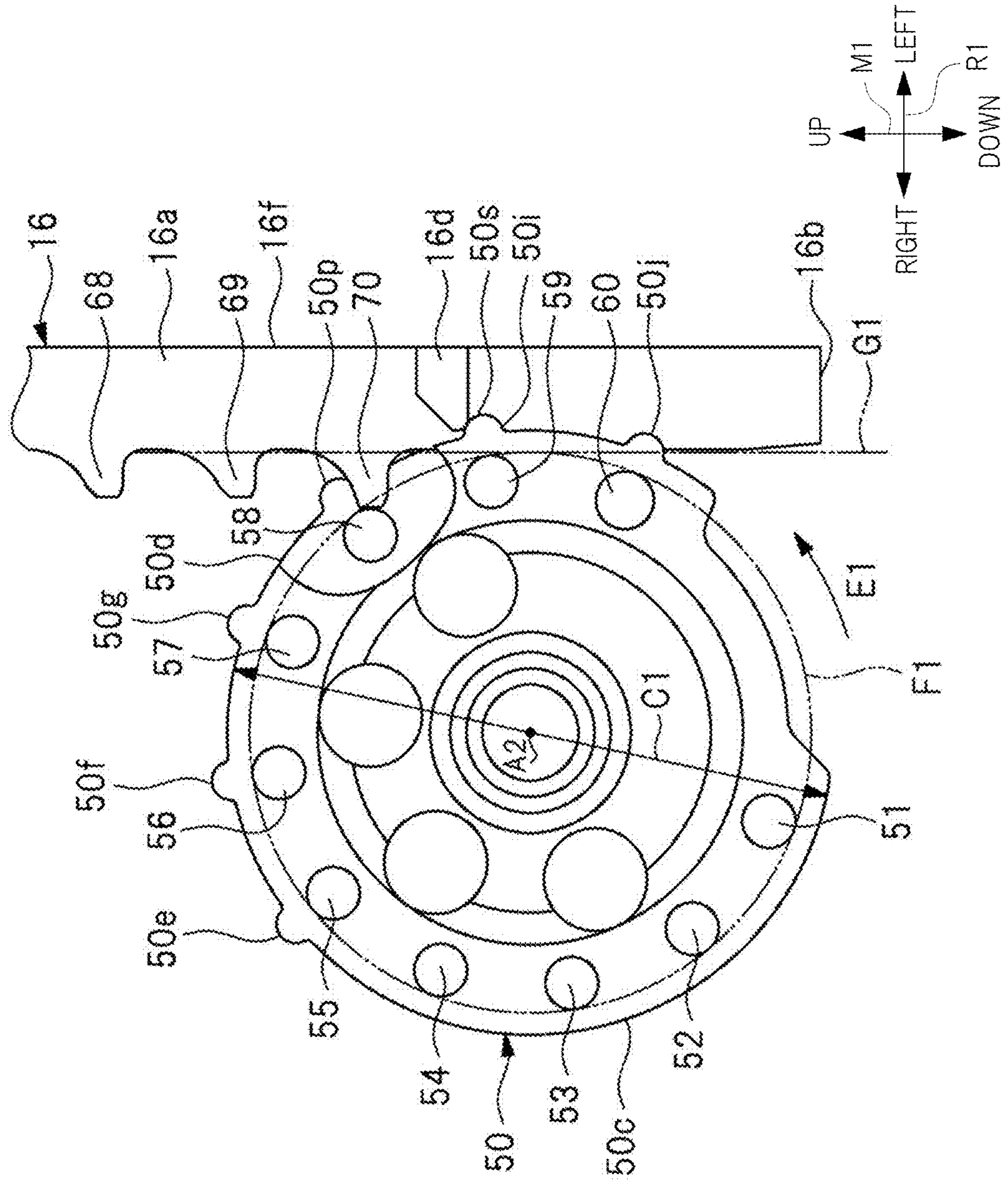

FIG. 21 is a conceptual view illustrating installation conditions of a convex portion of the pin wheel and a convex portion of the driver blade in the working machine according to the second embodiment of the present invention.

Figure 22:
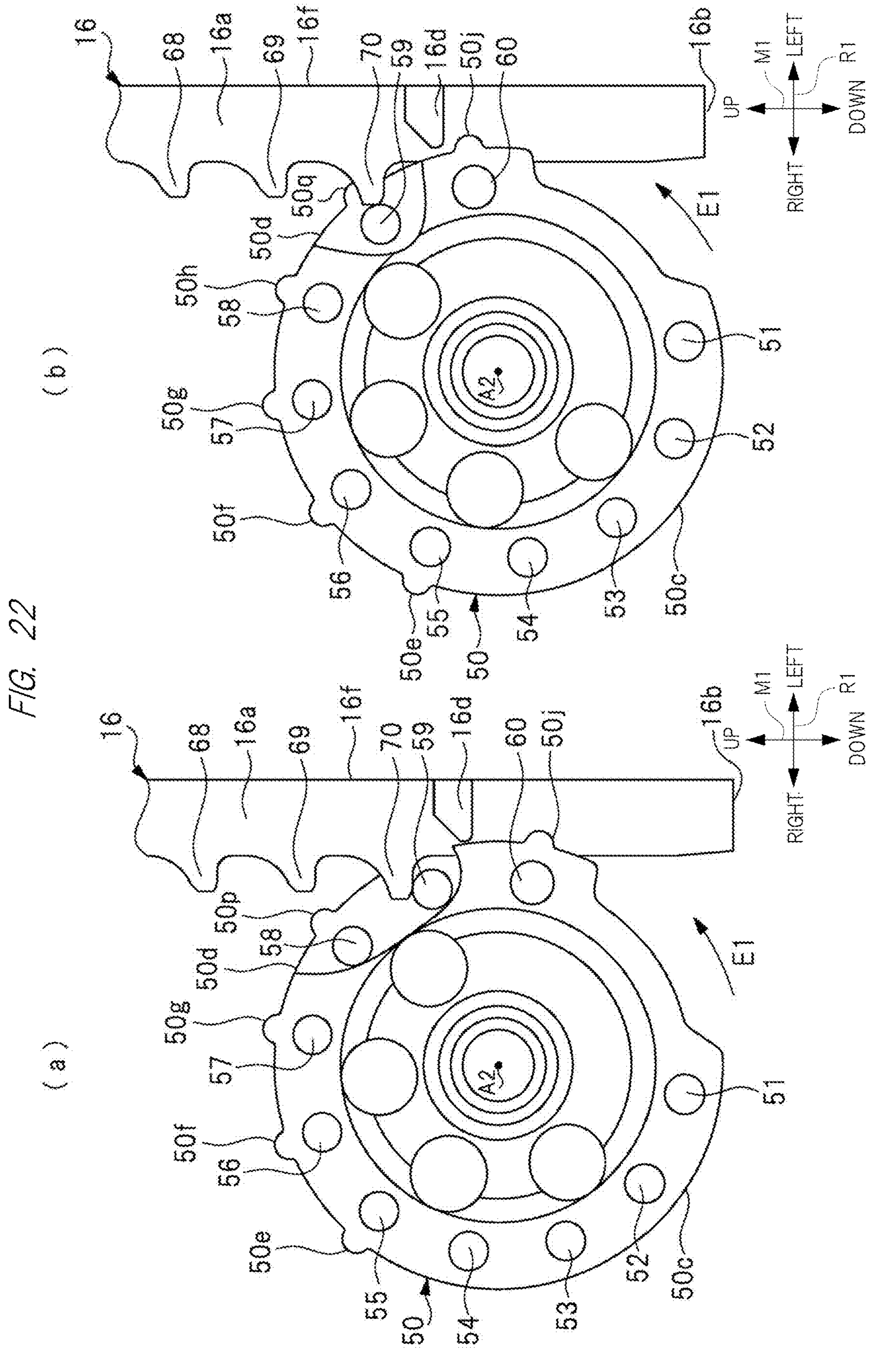

FIG. 22 is a partially enlarged view illustrating a winding operation of the working machine according to the second embodiment when one-step misalignment occurs, in which FIG. 22(*a*) is an engagement state between a rack and a pin during winding, and FIG. 22(*b*) is a state at the time of driver blade release.

Figure 23:
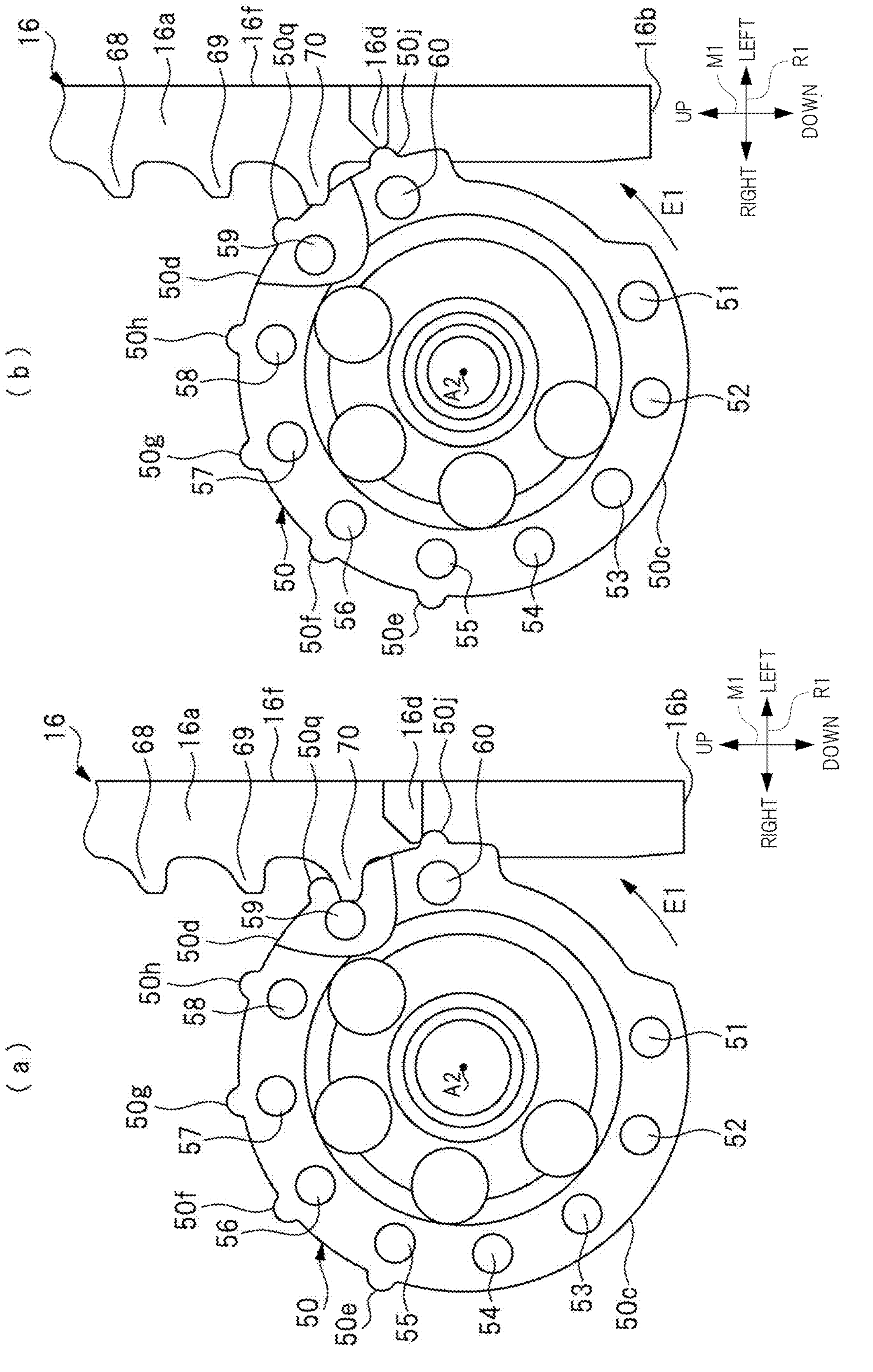

FIG. 23 is a partially enlarged view illustrating the winding operation of the working machine according to the second embodiment when one-step misalignment occurs, in which FIG. 23(*a*) is a state at the time of a first collision in which a convex portion of the driver blade collides with a convex portion of the pin wheel, and FIG. 23(*b*) is a state at the time of driver blade release after the first collision.

Figure 24:
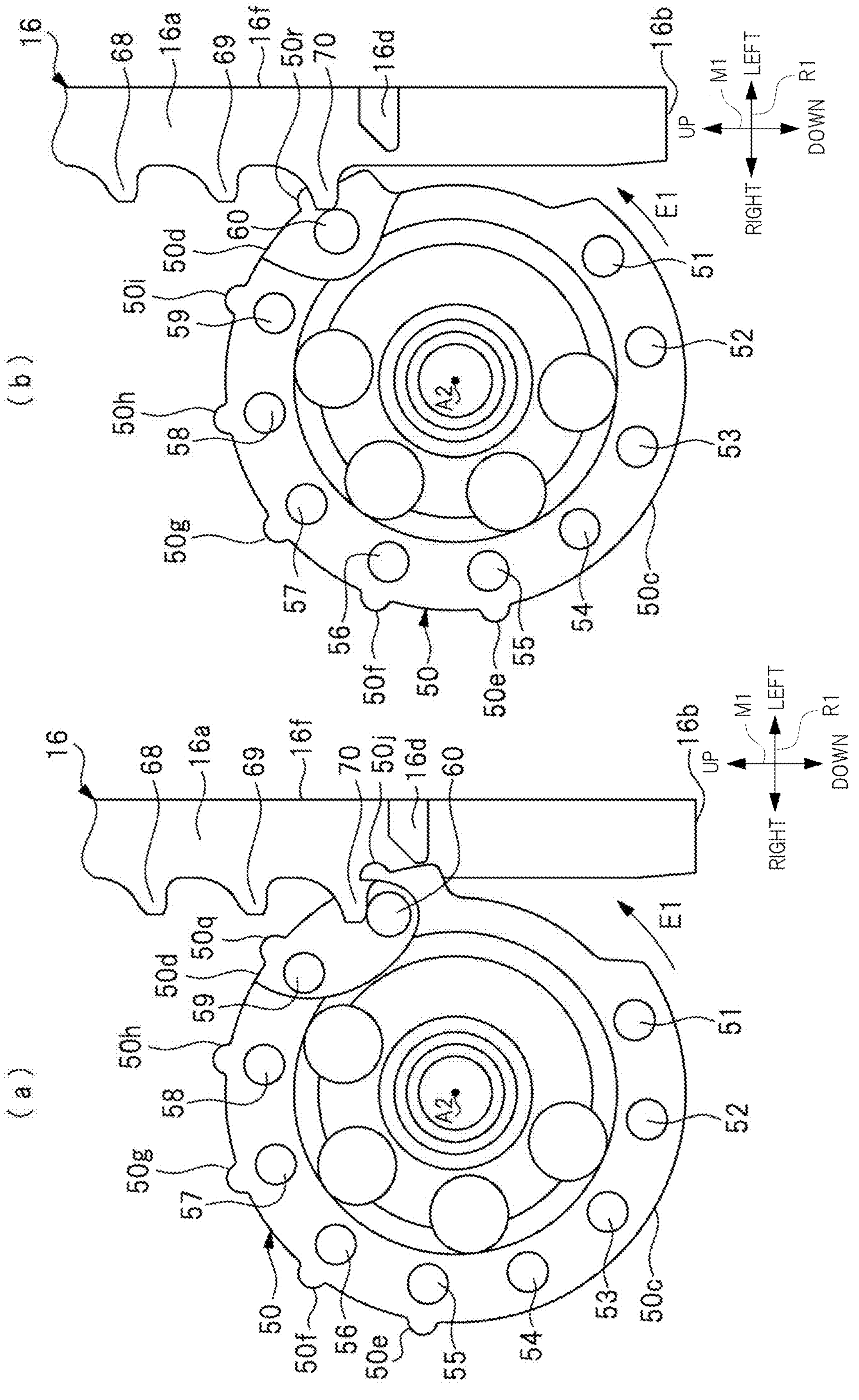

FIG. 24 is a partially enlarged view illustrating the winding operation of the working machine according to the second embodiment when one-step misalignment occurs, in which FIG. 24(*a*) is a state at the time of a second collision in which a final rack collides with a winding pin after a first collision, and FIG. 24(*b*) is a state at the time of driver blade release after the second collision.

Figure 25:
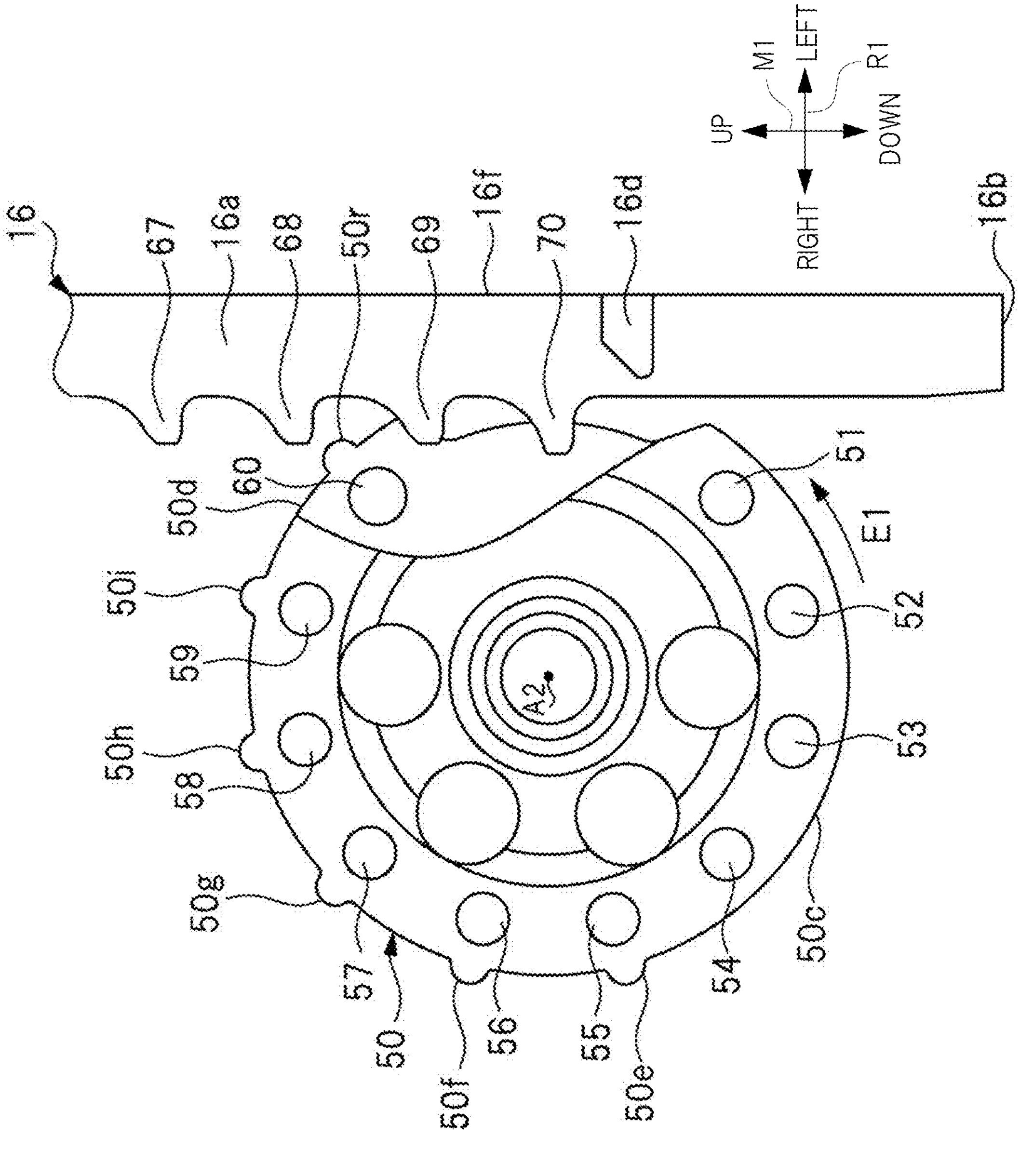

FIG. 25 is a partially enlarged view illustrating a state after the driver blade release in the winding operation of the working machine according to the second embodiment when one-step misalignment occurs.

Figure 26:
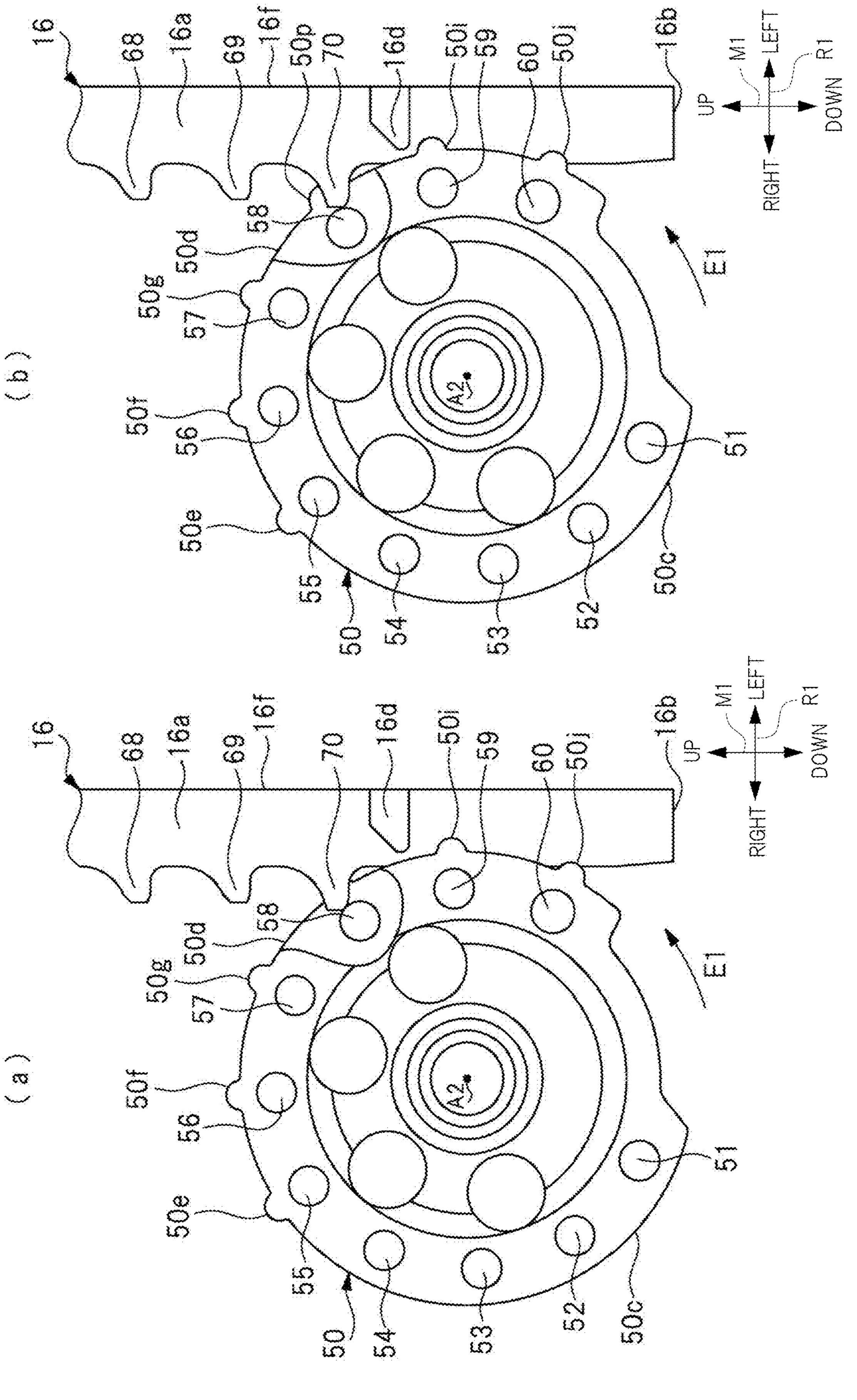

FIG. 26 is a partially enlarged view illustrating a winding operation of the working machine according to the second embodiment when a two-step misalignment occurs, in which FIG. 26(*a*) is an engagement state between a rack and a pin during winding, and FIG. 26(*b*) is a state at the time of driver blade release.

Figure 27:
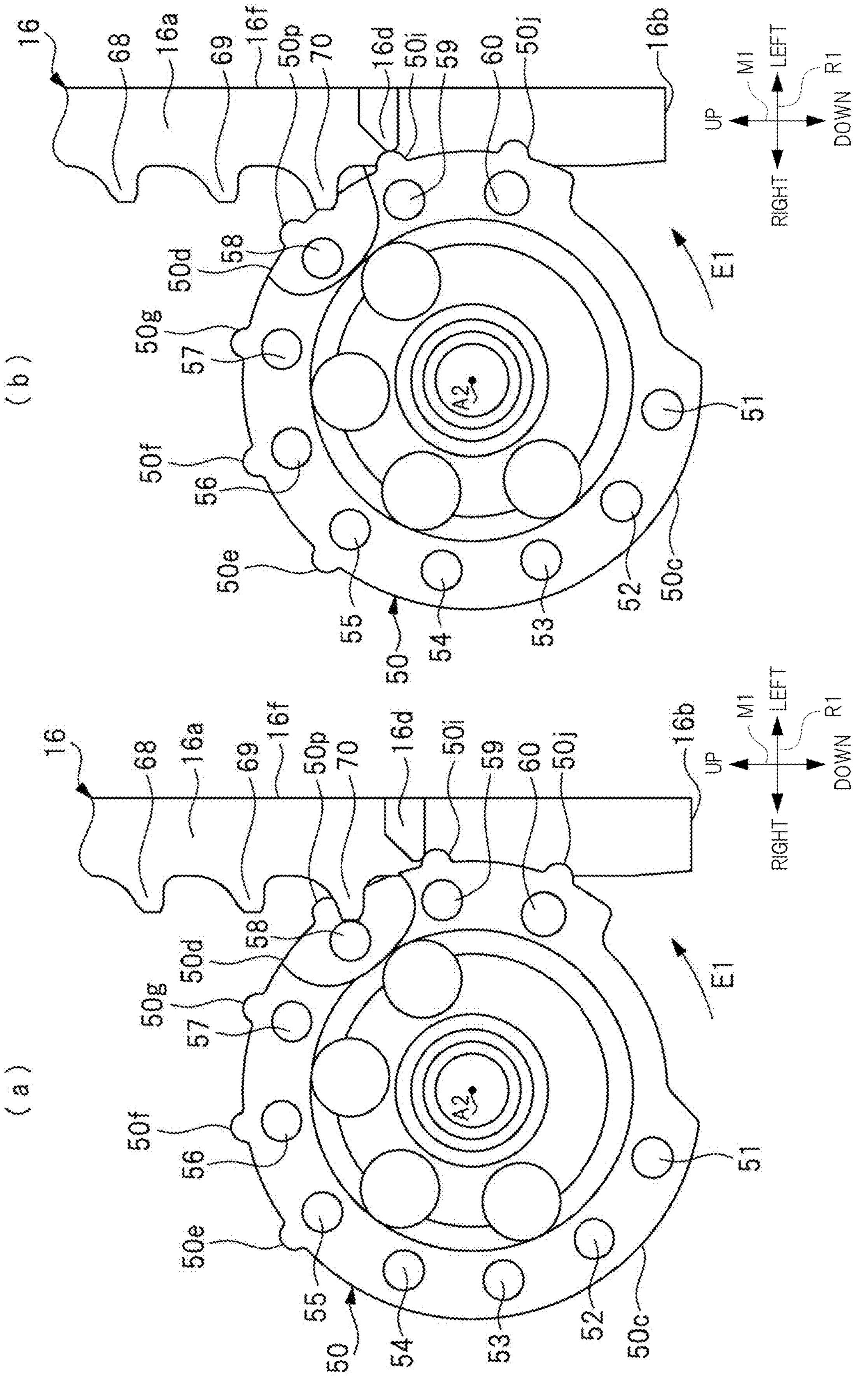

FIG. 27 is a partially enlarged view illustrating a winding operation of the working machine according to the second embodiment when a two-step misalignment occurs, in which FIG. 27(*a*) is a state at the time of a first collision in which a convex portion of a driver blade collides with a convex portion of a pin wheel, and FIG. 27(*b*) is a state at the time of driver blade release after the first collision.

Figure 28:
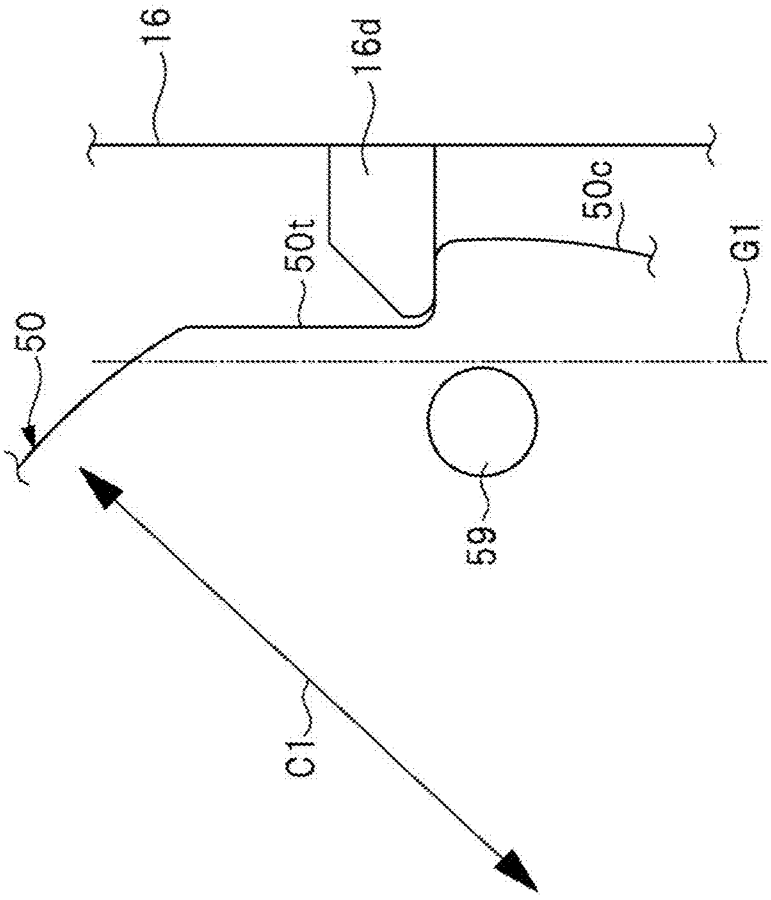

FIG. 28 is a conceptual view illustrating an engagement state between a pin wheel and a driver blade of a fifth modification in the working machine of the second embodiment.

DETAILED DESCRIPTION OF PREFERRED EMBODIMENTS (First Embodiment) A working machine according to a first embodiment of the present invention will be described with reference to the drawings. In the first embodiment, a striking machine will be described as an example of the working machine.

Figure 1:
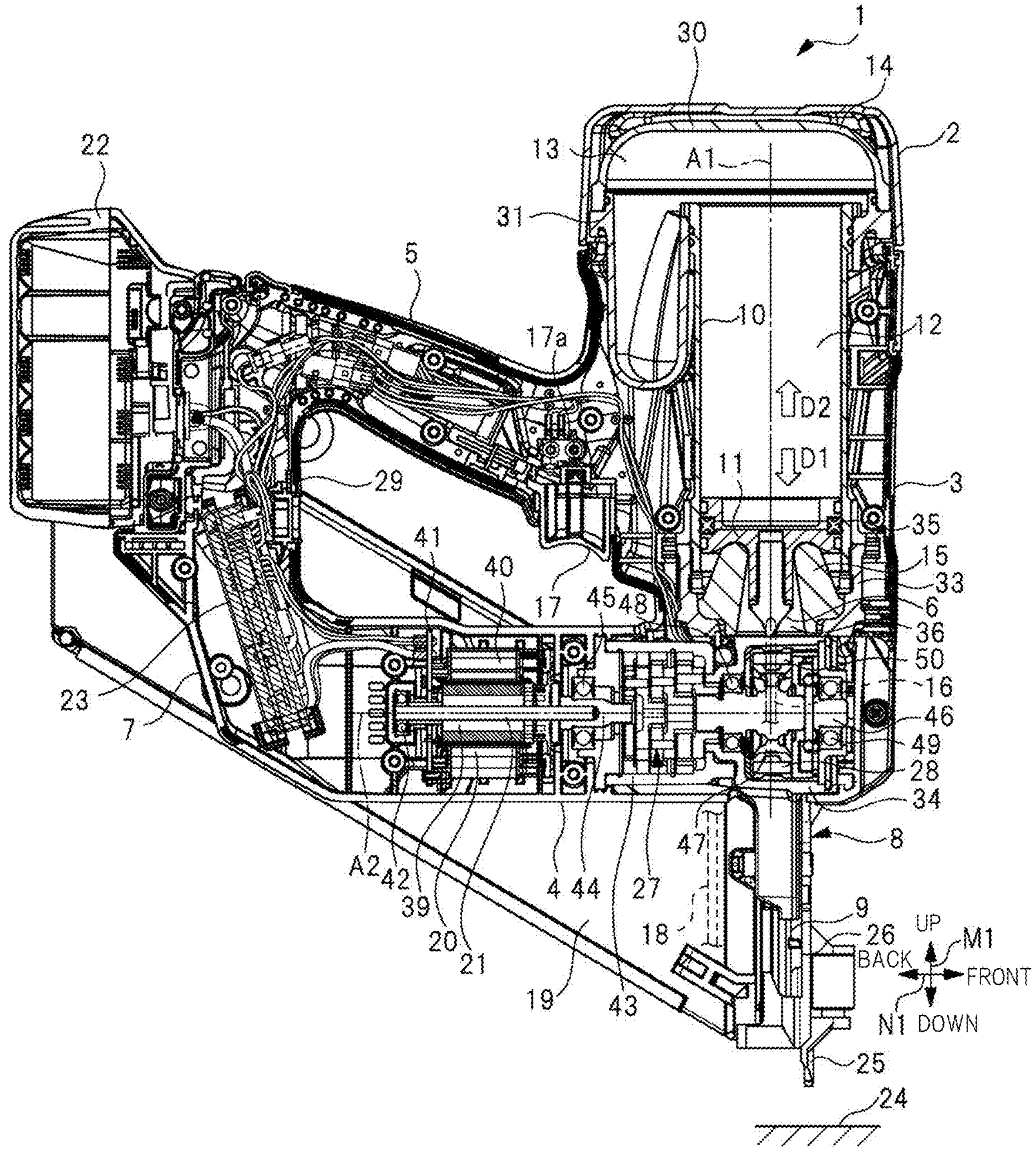
FIG. 1 is a side sectional view illustrating an internal structure of a working machine according to a first embodiment of the present invention.
Figure 2:
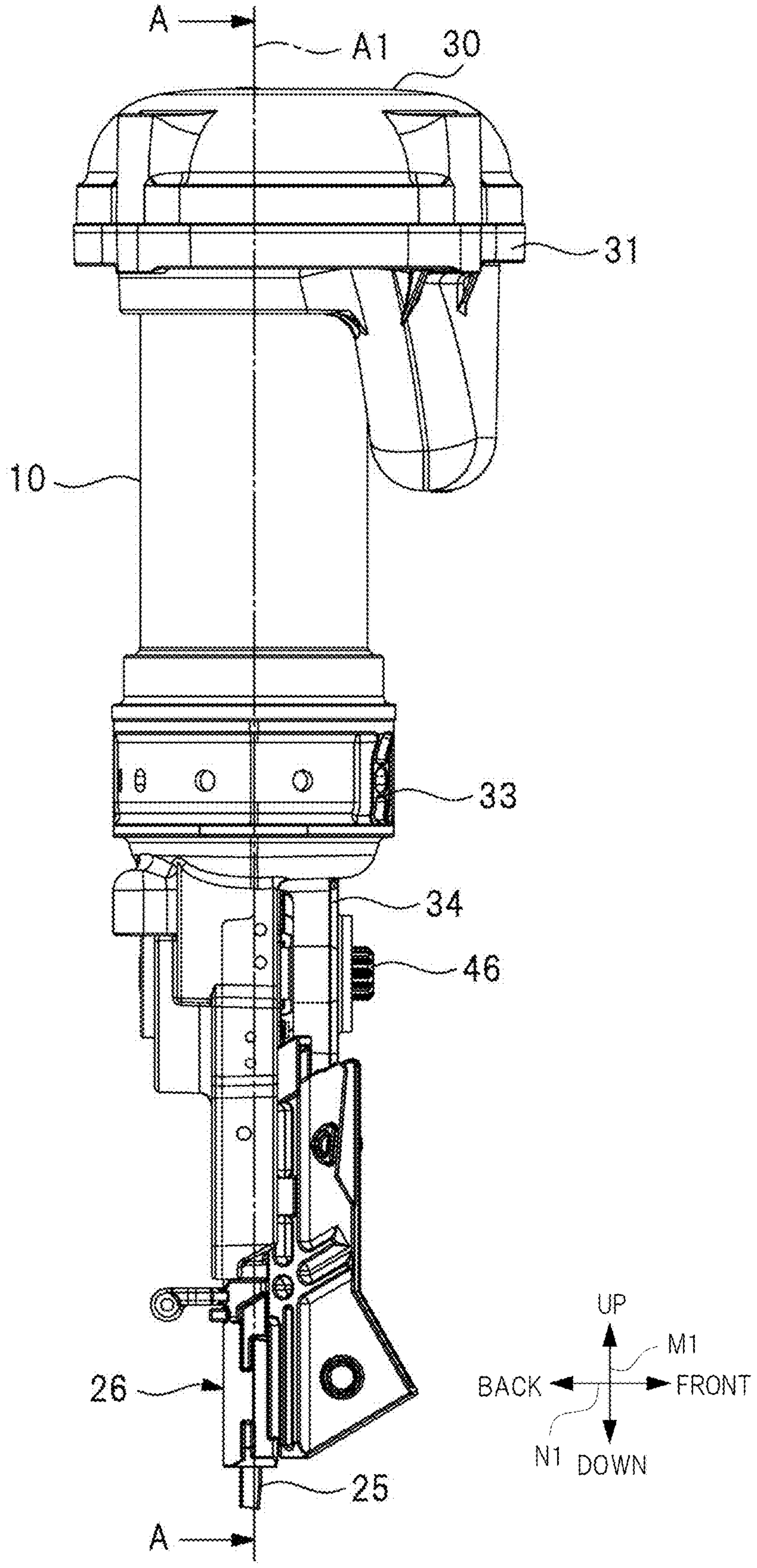
FIG. 2 is a side external view of a striking unit portion inside the working machine in FIG. 1.

A striking machine (working machine) 1 illustrated in FIGS. 1 and 2 is an air compression type working machine, and includes a housing 2, a striking portion 6, a nose portion 26, a battery (power supply portion) 22, an electric motor (motor) 20, a speed reduction mechanism 27, a wind-up mechanism 28, and a pressure accumulation container 14.

The housing 2 is an outer shell element of the striking machine 1, and includes a cylinder case 3, a handle 5, a motor case 4, and a mounting portion 29. The cylinder case 3 has a tubular shape, and the handle 5 and the motor case 4 are connected to the cylinder case 3. The mounting portion 29 has one end connected to the handle 5 and the other end connected to the motor case 4 via a coupling portion 7.

The battery 22 can be attached to and detached from the mounting portion 29. The electric motor 20 is disposed in the motor case 4. The pressure accumulation container 14 includes a cap 30 and a holder 31 to which the cap 30 is attached. A head cover 32 is attached to the cylinder case 3, and the pressure accumulation container 14 is disposed over the inside of the cylinder case 3 and the inside of the head cover 32.

Furthermore, a cylindrical cylinder 10 is accommodated in the cylinder case 3. The cylinder 10 is made of metal, for example, aluminum or iron. The cylinder 10 is positioned in the direction along a center line A1 and the radial direction with respect to the cylinder case 3. The center line A1 passes through the center of the cylinder 10. The radial direction is a radial direction of a virtual circle centered on the center line A1. In addition, a pressure accumulation chamber 13 is formed over the inside of the pressure accumulation container 14 and the inside of the cylinder 10. The pressure accumulation chamber 13 is filled with compressed gas. As the compressed gas, an inert gas can be used in addition to air. The inert gas includes, for example, nitrogen gas and rare gases. In the first embodiment, an example in which the pressure accumulation chamber 13 is filled with air will be described. The pressure accumulation chamber 13 is also a biasing portion that biases the striking portion 6 downward (one side) in the vertical direction (first direction) M1.

The striking portion 6 is disposed from the inside to the outside of the housing 2. The striking portion 6 includes a piston 11 and a driver blade 16. The piston 11 is operable in a direction along the center line A1 in a piston chamber 12 of the cylinder 10. That is, the cylinder 10 is a member that guides the movement of the piston 11. An annular seal member 35 is attached to an outer peripheral surface of the piston 11. The seal member 35 is in contact with the inner peripheral surface of the cylinder 10 to form a seal surface. The driver blade 16 is made of, for example, metal, nonferrous metal, or steel. As the striking portion 6, the piston 11 and the driver blade 16 are provided as separate members, and the piston 11 and the driver blade 16 are connected.

Therefore, the striking portion 6 can strike a fastener 18 such as a nail by moving downward (one side) in the vertical direction (first direction) M1.

The nose portion 26 is disposed over the inside and the outside of the cylinder case 3. The nose portion 26 includes a damper support portion 33, an ejection portion 8, and a cylindrical portion 34. The damper support portion 33 has a tubular shape. A damper 15 is disposed in the damper support portion 33. The damper 15 may be made of either synthetic rubber or silicone rubber. The damper 15 has a guide hole 36. The center line A1 passes through the guide hole 36. The driver blade 16 is disposed in the guide hole 36 and moves in the vertical direction (first direction) M1.

The striking portion 6 can be actuated in the striking direction D1 and the return direction D2 along the center line A1. The striking direction D1 and the return direction D2 are opposite to each other. The striking direction D1 is a direction in which the piston 11 approaches the damper 15. The return direction D2 is a direction in which the piston 11 is separated from the damper 15. The striking portion 6 is constantly biased in the striking direction D1 by the gas pressure of the pressure accumulation chamber 13. The actuation of the striking portion 6 in the striking direction D1 can be defined as lowering. The actuation of the striking portion 6 in the return direction D2 can be defined as rising. The striking direction D1 is the same as the lower side (one side) of the vertical direction (first direction) M1. The return direction D2 is the same as the upper side (other side) of the vertical direction (first direction) M1.

In the first embodiment, the operation of pushing up the striking portion 6 toward the pressure accumulation container 14 is called winding. Therefore, the winding operation of the striking portion 6 refers to an operation of pushing up the striking portion 6 in the vertical direction M1.

The ejection portion 8 of the striking machine 1 is connected to the damper support portion 33 and protrudes from the damper support portion 33 in the direction along the center line A1. The ejection portion 8 has an ejection passage 9, and the ejection passage 9 is provided along the center line A1. The driver blade 16 can be actuated in a direction along the center line A1 in the ejection passage 9.

An electric motor 20 is disposed in the motor case 4. The electric motor 20 includes a rotor 39 and a stator 40. The stator 40 is attached to the motor case 4. The rotor 39 is attached to an output shaft 21, and an end portion of the output shaft 21 is rotatably supported by the motor case 4 via a bearing 42. The electric motor 20 is, for example, a brushless motor, and when a voltage is applied to the electric motor 20, the rotor 39 rotates about a center line A2.

Furthermore, a gear case 43 is provided in the motor case 4. The gear case 43 has a cylindrical shape. The speed reduction mechanism 27 is provided in the gear case 43. The speed reduction mechanism 27 includes a plurality of sets of planetary gear mechanisms. An input element of the speed reduction mechanism 27 is connected to the output shaft 21 via a power transmission shaft 44. The power transmission shaft 44 is rotatably supported by a bearing 45.

A pin wheel 50 is assembled in the cylindrical portion 34, and a rotation shaft 46 of the pin wheel 50 is further provided. The rotation shaft 46 is rotatably supported by bearings 48 and 49. The output shaft 21, the power transmission shaft 44, the speed reduction mechanism 27, and the rotation shaft 46 are concentrically arranged around the center line A2. An output element 47 of the speed reduction mechanism 27 and the rotation shaft 46 are concentrically arranged, and the output element 47 and the rotation shaft 46 rotate integrally. The speed reduction mechanism 27 is disposed on a power transmission path from the electric motor 20 to the rotation shaft 46. The wind-up mechanism 28 that pushes up the driver blade 16 converts the rotational force of the rotation shaft 46 into a force that biases the striking portion 6 in the return direction D2.

In addition, the striking machine 1 is provided with a trigger 17 and a trigger sensor 17*a*. The trigger 17 and the trigger sensor 17*a* are provided on the handle 5. The trigger sensor 17*a* detects the presence or absence of the operation force applied to the trigger 17 and outputs a signal corresponding to the detection result.

The battery 22 as a power supply unit has a plurality of battery cells. These battery cells are secondary batteries capable of charging and discharging, and known battery cells such as a lithium ion battery, a nickel hydrogen battery, a lithium ion polymer battery, and a nickel cadmium battery can be arbitrarily used.

The striking machine 1 is provided with a magazine 19. The magazine 19 is supported by the ejection portion 8 and the mounting portion 29. The fastener 18 is accommodated in the magazine 19. The magazine 19 includes a feeder (not illustrated), and the feeder sends the fastener 18 in the magazine 19 to the ejection passage 9. That is, the feeder moves the fastener 18 in the magazine 19 to the front side in the front-rear direction N1. The ejection portion 8 is made of metal or synthetic resin. A push lever 25 is attached to the ejection portion 8. The push lever 25 can be actuated within a predetermined range in a direction along the center line A1 with respect to the ejection portion 8. Furthermore, the ejection portion 8 is provided with an elastic member (not illustrated) that biases the push lever 25 in a direction along the center line A1. The elastic member is, for example, a metal spring, and biases the push lever 25 in a direction away from the damper support portion 33.

In addition, the striking machine 1 is provided with a controller (control unit) 23. The controller 23 is provided in the mounting portion 29, and mainly controls driving of the electric motor 20. The controller 23 includes a microprocessor and controls the rotation and stop of the electric motor 20, the rotation speed of the electric motor 20, and the rotational direction of the electric motor 20. A motor substrate 41 is provided in the motor case 4. An inverter circuit (not illustrated) is provided on the motor substrate 41, and this inverter circuit connects and disconnects the stator 40 of the electric motor 20 and the battery 22. The controller 23 controls the operation of the electric motor 20 by controlling the inverter circuit.

Figure 3:
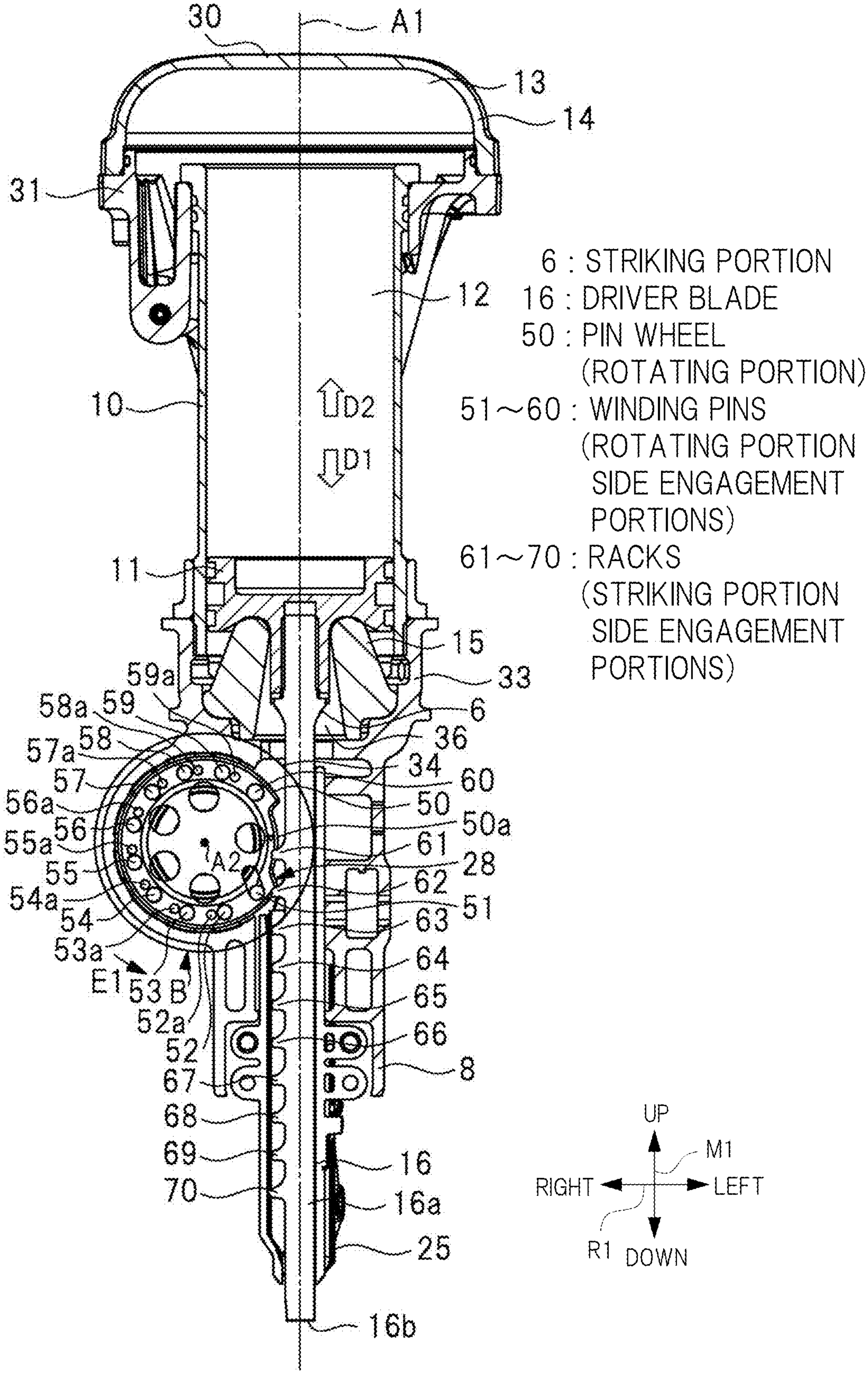
FIG. 3 is a cross-sectional view illustrating a structure taken along line A-A in FIG. 2.
Figure 4:
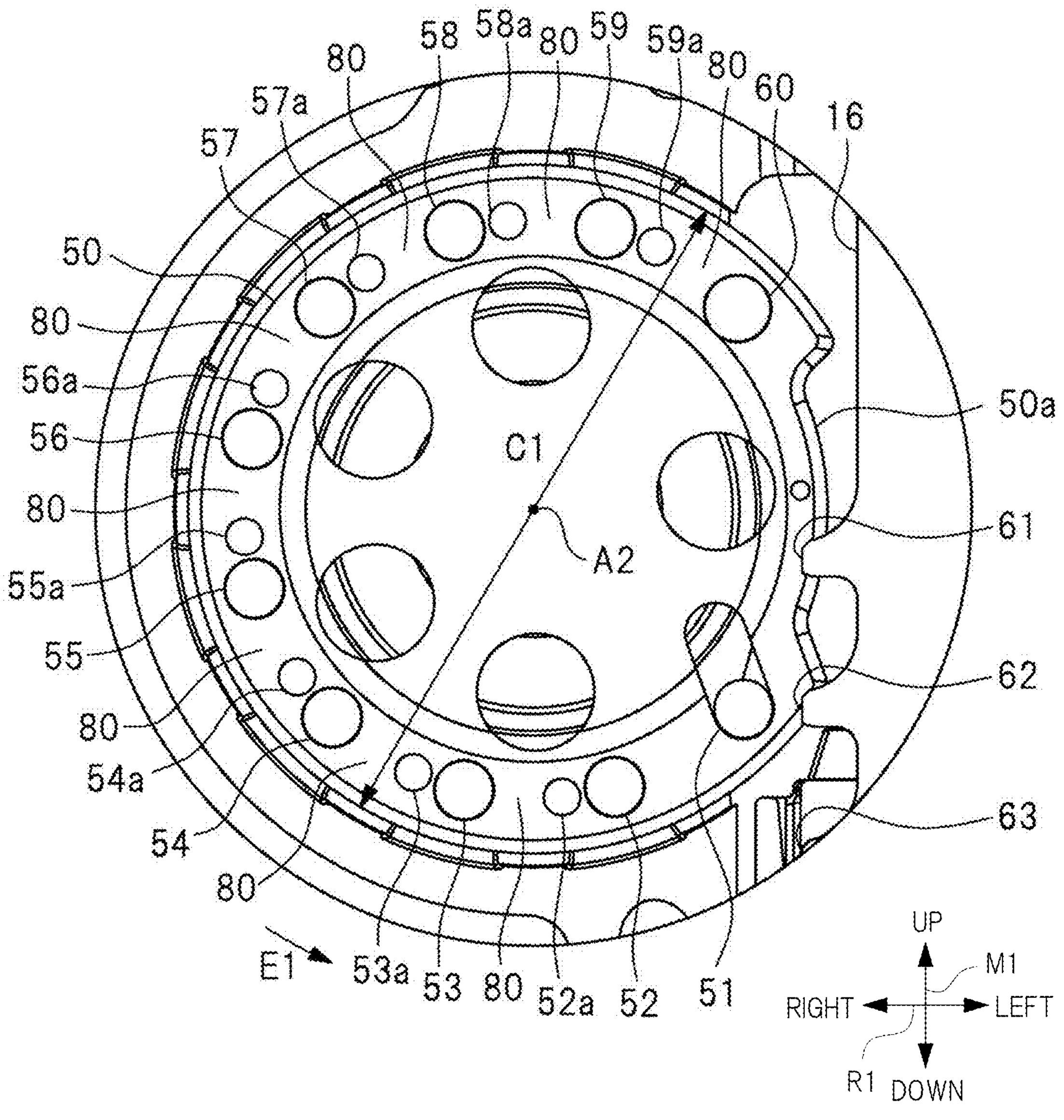
FIG. 4 is a partially enlarged view illustrating an enlarged structure of a portion B in FIG. 3.

Next, the wind-up mechanism 28 included in the striking machine 1 will be described. As illustrated in FIGS. 3 and 4, the wind-up mechanism 28 includes the driver blade 16, a plurality of striking portion side engagement portions provided on the driver blade 16, a pin wheel (rotating portion) 50, and a plurality of rotating portion side engagement portions provided on the pin wheel 50.

The pin wheel 50 is attached to the rotation shaft 46. The pin wheel 50 is a rotating portion that rotates by the driving force of the electric motor 20. For example, the pin wheel 50 is made of metal, non-ferrous metal, or steel. The pin wheel 50 rotates about the center line A2. The center line A2 is disposed apart from the driver blade 16 in the left-right direction R1 in a direction intersecting the actuation direction of the striking portion 6. The pin wheel 50 is a disk-shaped member that can be engaged with and disengaged from the driver blade 16.

The pin wheel 50 has a plurality of rotating portion side engagement portions provided along the rotational direction E1 of the pin wheel 50. As an example of the plurality of rotating portion side engagement portions, 10 winding pins 51, 52, 53, 54, 55, 56, 57, 58, 59, and 60 are provided on the pin wheel 50. Hereinafter, the winding pins 51 to 60 refer to the winding pins 51, 52, 53, 54, 55, 56, 57, 58, 59, and 60. The winding pins 51 to 60 are provided separately from the pin wheel 50, and is fixed so as to protrude from the disk surface of the pin wheel 50. Further, the winding pins 51 to 60 are disposed on the same circumference about the center line A2.

In the striking machine 1 of the first embodiment, the pin wheel 50 is provided with a plurality of first interference portions (interference portions). As an example of the plurality of first interference portions, the pin wheel 50 is provided with abutment pins 52*a*, 53*a*, 54*a*, 55*a*, 56*a*, 57*a*, 58*a*, and 59*a* along with the plurality of rotating portion side engagement portions in the rotational direction E1 of the pin wheel 50. Hereinafter, the abutment pins 52*a* to 59*a* refer to the abutment pins 52*a*, 53*a*, 54*a*, 55*a*, 56*a*, 57*a*, 58*a*, and 59*a*. The abutment pins 52*a* to 59*a* are provided separately from the pin wheel 50 similarly to the winding pins 51 to 60, and are fixed so as to protrude from the disk surface of the pin wheel 50. Further, the abutment pins 52*a* to 59*a* are also arranged on the same circumference centered on the center line A2. The abutment pins 52*a* to 59*a* are pins that do not interfere with the plurality of striking portion side engagement portions in a normal striking operation (first striking operation) in which the driver blade 16 moves downward in the vertical direction M1 by the biasing force of the compressed air stored in the pressure accumulation chamber 13 and strikes the fastener 18. On the other hand, the abutment pins 52*a* to 59*a* are pins that interfere with the plurality of striking portion side engagement portions in an abnormal striking operation (second striking operation) due to a misalignment described below. In the normal striking operation (first striking operation) described above, all of the plurality of striking portion side engagement portions are engaged with the rotating portion side engagement portion. In the above-described abnormal striking operation (second striking operation), some of the plurality of striking portion side engagement portions are not engaged with the rotating portion side engagement portions.

As illustrated in FIG. 4, the pin wheel 50 has a notch 50*a* formed in a second region at a predetermined angle in the rotational direction E1 of the pin wheel 50. The notch 50*a* is formed in a region forming 90° as an example. The minimum outer diameter of the notch 50*a* centered on the center line A2 is smaller than the maximum outer diameter of a first region where the notch 50*a* is not formed. The first region where the notch 50*a* is not formed is a region of approximately 270° in the rotational direction E1 of the pin wheel 50.

On the other hand, as illustrated in FIG. 3, the driver blade 16 is a rod-like member, and moves upward in the vertical direction M1 from a standby position of the driver blade 16 as the pin wheel 50 rotates in the E1 direction in a state of being engaged with the pin wheel 50. When the engagement with the pin wheel 50 is released, the driver blade 16 moves downward in the vertical direction M1 by the biasing force of the compressed air stored in the pressure accumulation chamber 13, thereby performing a striking operation of striking the fastener 18. Further, after the striking, the driver blade 16 re-engages with the pin wheel 50 as the pin wheel 50 rotates in the rotational direction E1, and the pin wheel 50 further rotates to move the driver blade 16 upward in the vertical direction M1 to the standby position of the driver blade 16.

In addition, the driver blade 16 is provided with a plurality of striking portion side engagement portions that engage with the plurality of winding pins 51 to 60 in the striking operation of moving downward in the vertical direction M1 by the biasing force of the compressed air stored in the pressure accumulation chamber 13 and striking the fastener 18. The plurality of striking portion side engagement portions are provided in the same number as the plurality of winding pins 51 to 60 in the rotational direction E1 of the pin wheel 50.

Specifically, as illustrated in FIG. 3, the driver blade 16 is provided with racks 61, 62, 63, 64, 65, 66, 67, 68, 69, and 70 as a plurality of striking portion side engagement portions arranged in the vertical direction M1. Hereinafter, the racks 61 to 70 refer to the racks 61, 62, 63, 64, 65, 66, 67, 68, 69, and 70. Specifically, a blade body portion 16*a* of the driver blade 16 is provided with the racks 61 to 70 in order from the upper side in the vertical direction M1. That is, the racks 61 to 70 are provided along the vertical direction M1, and are arranged in this order in the direction along the center line A1.

In the striking machine 1 of the first embodiment, the racks 61 to 70 are protrusions provided at an edge of the blade body portion 16*a* of the driver blade 16, and are provided integrally with the blade body portion 16*a*. Further, the racks 61 to 70 is disposed between a tip end 16*b* of the driver blade 16 in a direction along the center line A1 and the piston 11. The cross-sectional shape of the driver blade 16 is substantially quadrangular in a plane perpendicular to the center line A1, and the racks 61 to 70 can be engaged with the winding pins 51 to 60 of the pin wheel 50.

When the striking portion 6 is actuated in the return direction D2, the rack 61 among the plurality of racks is positioned at the head, that is, the first position in the return direction D2. When the striking portion 6 is actuated in the return direction D2, the racks 62, 63, 64, 65, 66, 67, 68, 69, and 70 are positioned behind the rack 61 in the moving direction of the striking portion 6.

The winding pins 51 to 60 of the pin wheel 50 and the racks 61 to 70 of the driver blade 16 are provided at positions overlapping each other in the direction along the center line A2, and are in a positional relationship of being engaged with each other in the winding operation of the driver blade 16.

In addition, the pin wheel 50 rotates counterclockwise (rotational direction E1), for example, by the rotational force of the electric motor 20. The winding pins 51 to 60 are arranged in this order along the rotational direction E1 of the pin wheel 50. The winding pin 51 is positioned at the head, that is, at the first position in the rotational direction E1 during one rotation of the pin wheel 50. Further, the winding pins 52, 53, 54, 55, 56, 57, 58, 59, and 60 are positioned behind the winding pin 51 in the rotational direction E1 of the pin wheel 50. Therefore, when the pin wheel 50 rotates in a state where the striking portion 6 is stopped, the winding pin 51 of the plurality of winding pins first approaches the operation area of the driver blade 16 in the rotational direction E1 of the pin wheel 50 as illustrated in FIG. 4.

Figure 5:
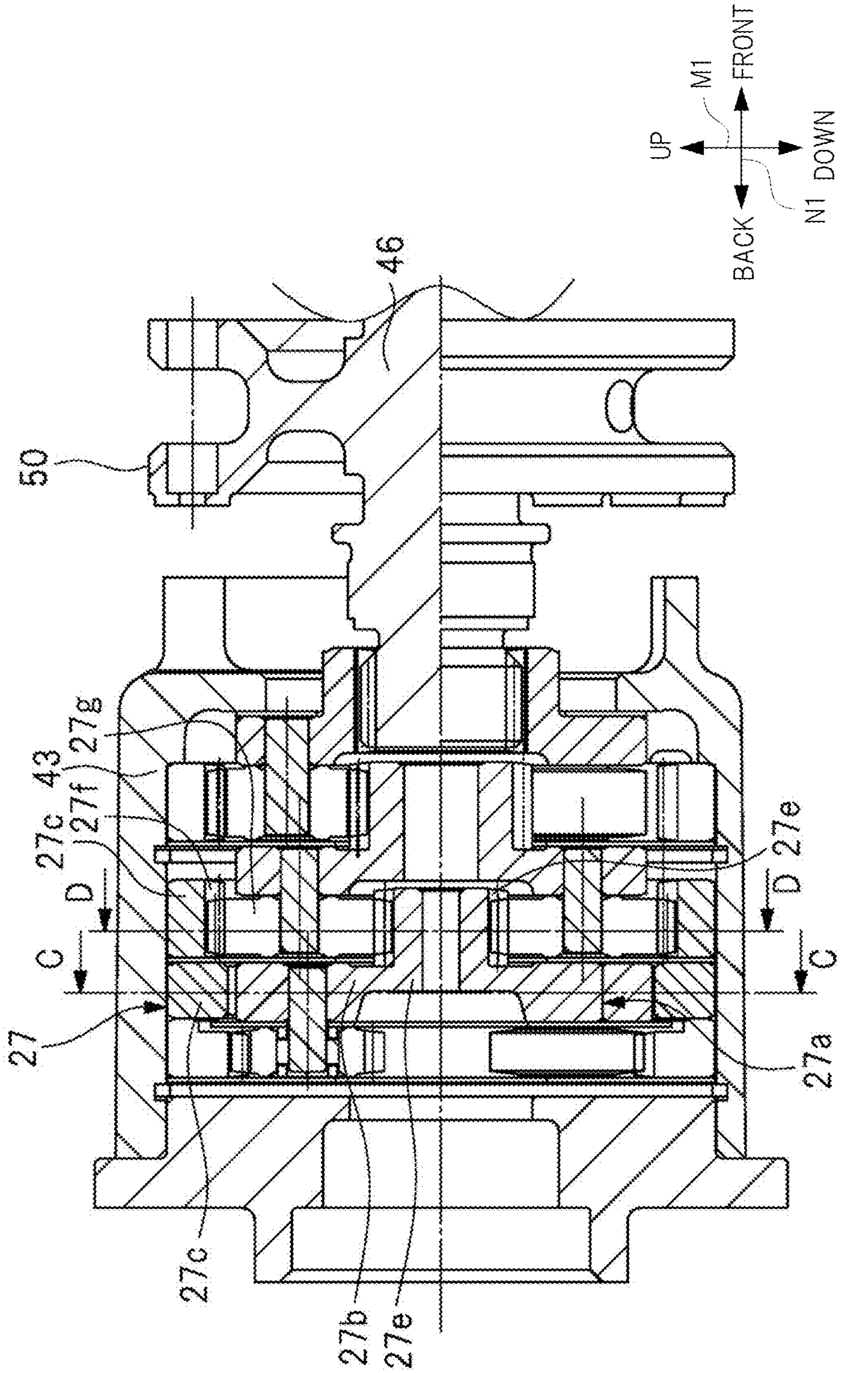
FIG. 5 is a cross-sectional view illustrating a structure of a speed reduction mechanism of the working machine in FIG. 1.

Next, the speed reduction mechanism of the striking machine 1 will be described with reference to FIGS. 5 and 6. As illustrated in FIG. 5, a speed reduction mechanism 27 that transmits power of the output shaft 21 of the electric motor 20 illustrated in FIG. 1 to the rotation shaft 46 of the pin wheel 50 is provided in the gear case 43. The speed reduction mechanism 27 includes a plurality of sets of planetary gear mechanisms, and is a mechanism that decelerates the power of the output shaft 21 of the electric motor 20 and transmits the power to the rotation shaft 46. As illustrated in FIG. 5, the planetary gear mechanism closest to the electric motor 20 among the plurality of sets of planetary gear mechanisms is provided with a one-way clutch 27*a*. The one-way clutch 27*a* is assembled to the power transmission shaft 44 together with a sun gear 27*e*, and includes an inner ring 27*b*, an outer ring 27*c*, and a pin member 27*d*.

Figure 6:
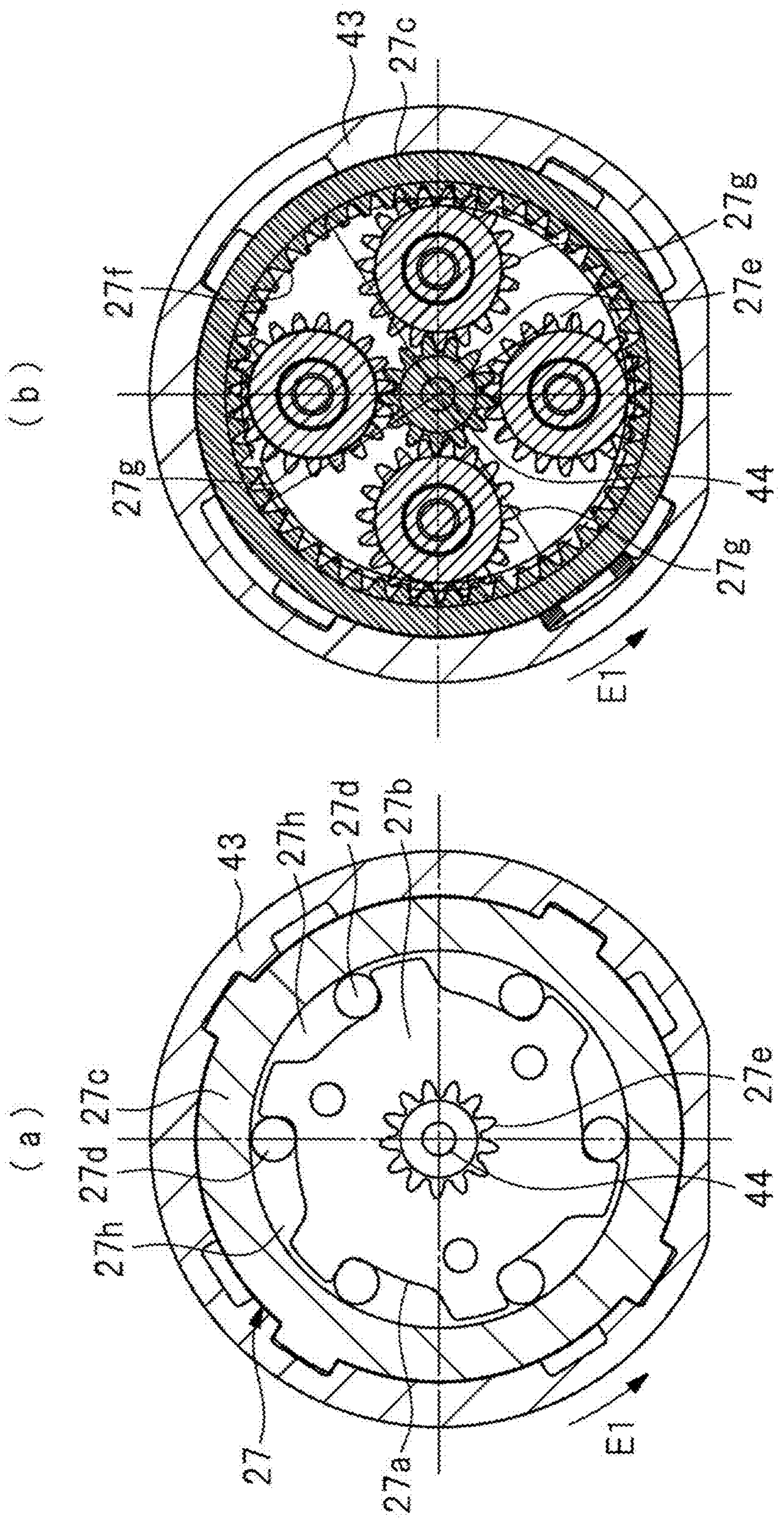
FIG. 6 is a view illustrating an internal structure of the speed reduction mechanism in FIG. 5, in which FIG. 6(*a*) is a cross-sectional view taken along line C-C in FIG. 5, and FIG. 6(*b*) is a cross-sectional view taken along line D-D in FIG. 5.

As illustrated in FIG. 6, the planetary gear mechanism in the second stage of the plurality of sets of planetary gear mechanisms is provided with a sun gear 27*e* assembled to the power transmission shaft 44, four planetary gears 27*g* that engage with the sun gear 27*e*, and an internal gear 27*f* that engages with the four planetary gears 27*g*. In the one-way clutch 27*a*, when the power transmission shaft 44 rotates in, for example, the rotational direction E1 by the rotation of the output shaft 21 of the electric motor 20, the inner ring 27*b* also rotates in the rotational direction E1. As the inner ring 27*b* rotates in the rotational direction E1, the pin wheel 50 illustrated in FIG. 5 also rotates in the rotational direction E1. On the other hand, when the pin wheel 50 attempts to rotate in the direction opposite to the rotational direction E1, the pin member 27*d* is sandwiched between wedge-shaped gaps 27*h*, and the inner ring 27*b* is locked. Due to the locking of the inner ring 27*b*, the pin wheel 50 has a structure that does not rotate in the direction opposite to the rotational direction E1. That is, a one-way clutch mechanism is provided. By the action of the one-way clutch mechanism, the rotation shaft 46 of the pin wheel 50 is rotatable in the rotational direction E1 but does not rotate in the direction opposite to the rotational direction E1. As a result, the position of the driver blade 16 can be maintained in the standby state of the driver blade 16. In other words, it is possible to prevent the driver blade 16 from lowering at the standby position of the driver blade 16.

Next, the abutment pin (first interference portion) provided on the pin wheel 50 of the first embodiment will be described. As illustrated in FIG. 4, the pin wheel 50 is provided with a plurality of abutment pins 52*a* to 59*a* along with the plurality of winding pins 51 to 60. Specifically, eight abutment pins 52*a* to 59*a* are provided. Here, among the plurality of racks 61 to 70 of the driver blade 16 illustrated in FIG. 3, the rack 61 disposed on the uppermost side in the vertical direction M1 is engaged with the winding pin 51 in the normal striking operation (first striking operation) of the striking portion 6, and is not engaged with the winding pin 51 in the abnormal striking operation (second striking operation) of the striking portion 6. Hereinafter, the second striking operation is also referred to as a misalignment operation between the driver blade 16 and the pin wheel 50. For example, when the misalignment operation occurs in the engagement between the driver blade 16 and the pin wheel 50, the final rack 70 disposed on the lowermost side among the plurality of racks 61 to 70 interferes with the abutment pin 59*a* immediately after the driver blade 16 is released.

In the pin wheel 50, each of the abutment pins 52*a* to 59*a* is provided in a region between the adjacent winding pins in the rotational direction E1 of the pin wheel 50. In addition, the abutment pins 52*a* to 59*a* are arranged on the circumference centered on the center line A2. In the pin wheel 50, the winding pins 51 to 60 are also disposed on the circumference centered on the center line A2, and the abutment pins 52*a* to 59*a* and the winding pins 51 to 60 are disposed on the same circumference. However, the abutment pins 52*a* to 59*a* and the winding pins 51 to 60 are not necessarily disposed on the same circumference. Preferably, the position of the outer peripheral portion of each of the abutment pins 52*a* to 59*a* in the radial direction C1 of the pin wheel 50 is the same position as the position of the outer peripheral portion of each of the winding pins 51 to 60 in the radial direction C1 of the pin wheel 50 or a position inward from the position of the outer peripheral portion of each of the winding pins 51 to 60. This makes it possible to prevent inhibition of the winding operation and the lowering operation after the winding-up of the driver blade 16.

Each of the abutment pins 52*a* to 59*a* is disposed at a position close to the winding pin on the upstream in the rotational direction E1 of the pin wheel 50 among the adjacent winding pins. For example, the abutment pin 52*a* disposed between the winding pin 52 and the winding pin 53 is disposed near the winding pin 52 disposed upstream of the winding pin 53 in the rotational direction E1 of the pin wheel 50. Similarly, the abutment pin 53*a* disposed between the winding pin 53 and the winding pin 54 is disposed near the winding pin 53 disposed upstream of the winding pin 54 in the rotational direction E1 of the pin wheel 50. That is, a gap 80 is provided between each abutment pin and the winding pin on the downstream. As a result, when the driver blade 16 is wound up to the upper side in the vertical direction M1, each rack of the driver blade 16 can be smoothly arranged in the gap 80 between the adjacent winding pins.

The winding pins 51 to 60 and the abutment pins 52*a* to 59*a* are cylindrical pins, and the diameters of the abutment pins 52*a* to 59*a* are smaller than the diameters of the winding pins 51 to 60. At the time of occurrence of the above-described misalignment, energy when the final rack 70 collides with the abutment pins 52*a* to 59*a* is dispersed and small, and thus, it is possible to reduce the diameters of the abutment pins 52*a* to 59*a*.

Figure 7:
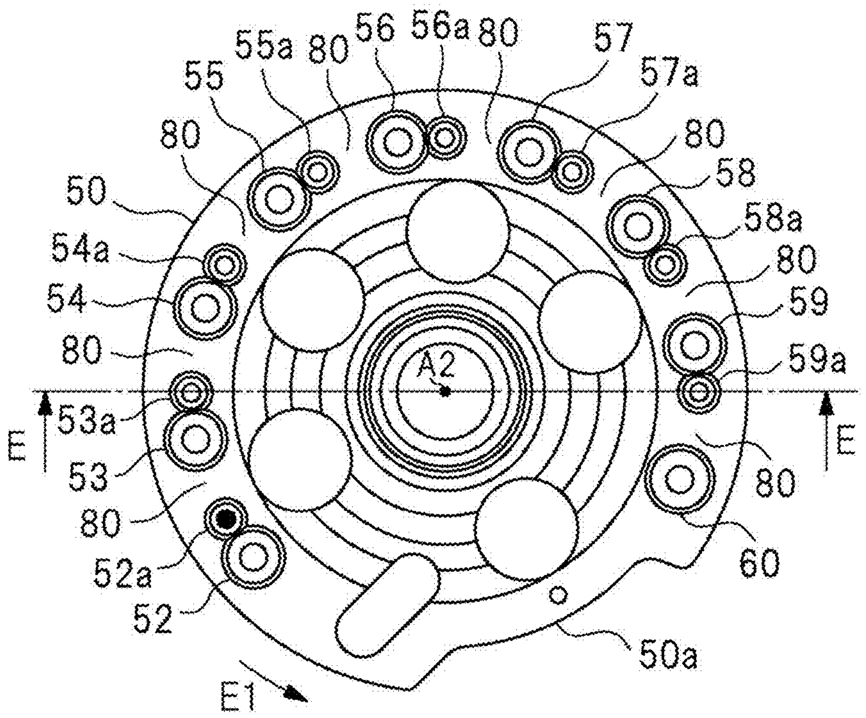
FIG. 7 is a view illustrating a structure of a pin wheel of the working machine in FIG. 1, in which FIG. 7(*a*) is an external view and FIG. 7(*b*) is a cross-sectional view taken along line E-E of FIG. 7(*a*).
Figure 7:
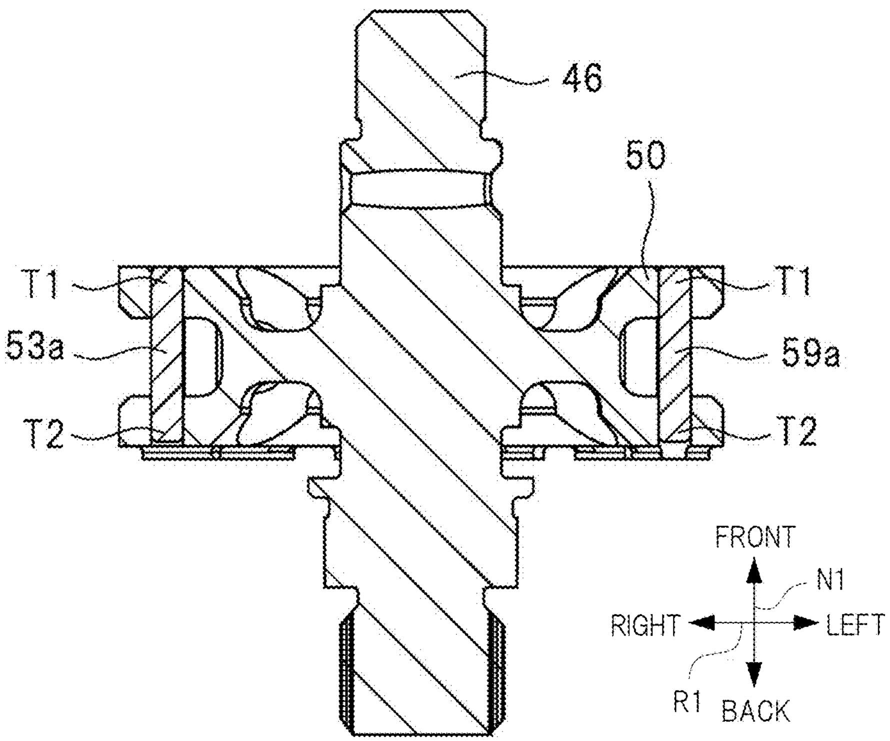

As illustrated in FIGS. 7(*a*) and 7(*b*), each of the abutment pins 52*a* to 59*a* has one end T1 and the other end T2 located on the opposite side of the one end T1, and in the pin wheel 50, both the one end T1 and the other end T2 of each of the abutment pins 52*a* to 59*a* are supported. That is, in the pin wheel 50, each of the abutment pins 52*a* to 59*a* has a both-end supporting structure. For example, as illustrated in FIG. 7(*b*), all the abutment pins including the abutment pins 53*a* and 59*a* have a both-end supporting structure. Accordingly, the support strength of each of the abutment pins 52*a* to 59*a* can be enhanced.

In addition, as illustrated in FIG. 11 to be described below, the final rack 70 disposed on the lowermost side among the plurality of racks 61 to 70 of the driver blade 16 has a pressing surface 70*a* capable of pressing the abutment pins 52*a* to 59*a* toward the center of the pin wheel 50 in the misalignment operation (second striking operation) between the driver blade 16 and the pin wheel 50.

Next, an example of the striking operation of the striking machine 1 of the first embodiment will be described. Here, first, a normal striking operation (first striking operation) of the driver blade illustrated in FIG. 8 will be described. The controller (control unit) 23 illustrated in FIG. 1 stops the supply of electric power to the electric motor 20 when detecting at least one of the facts that no operation force is applied to the trigger 17 and the fact that the push lever 25 is not pressed against a struck material 24. Therefore, the electric motor 20 is stopped, and the striking portion 6 is stopped at the standby position.

Figure 8:
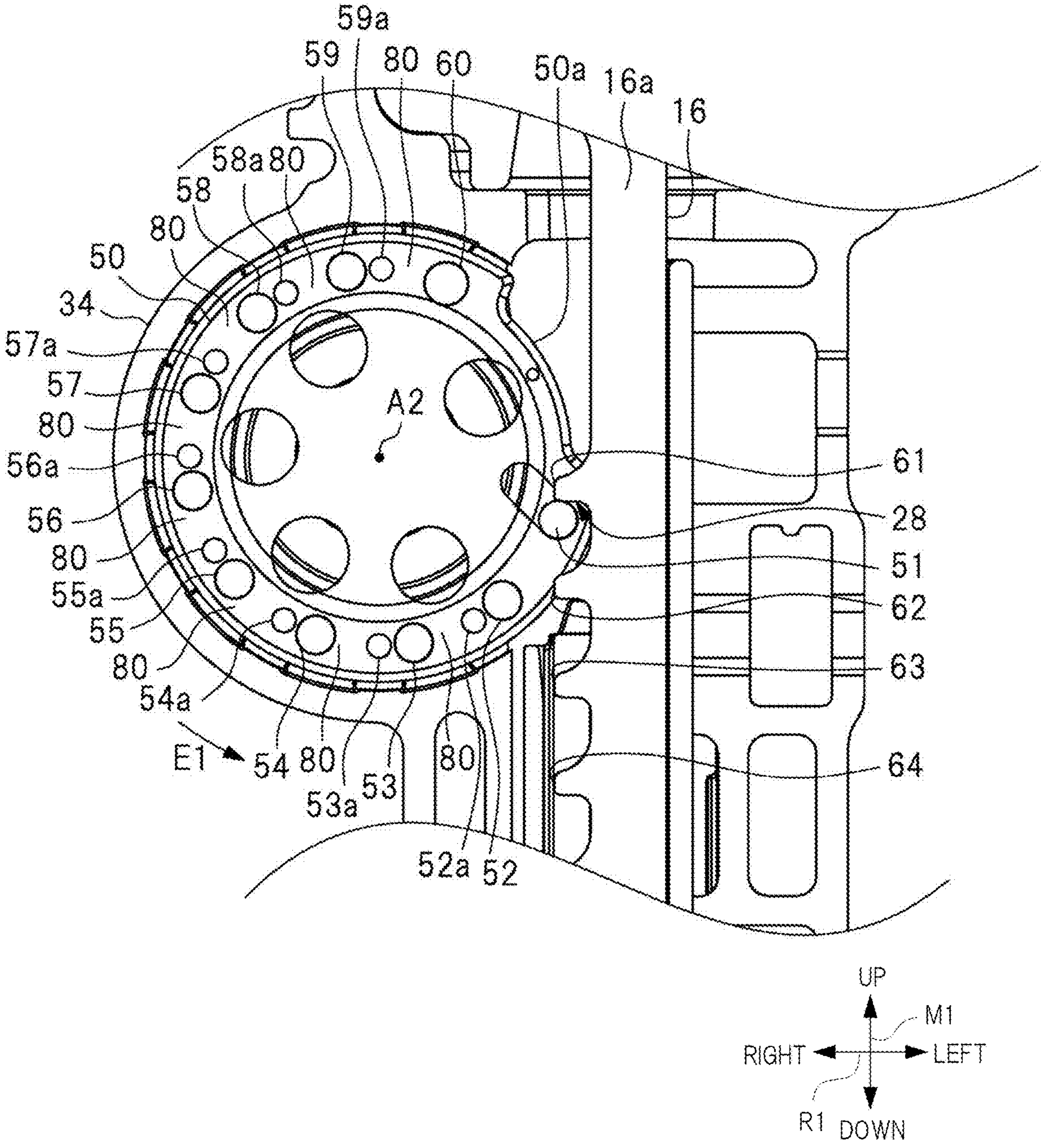
FIG. 8 is a partially enlarged view illustrating an engagement state between a rack and a pin at the start of winding in a normal winding operation of the working machine in FIG. 1.

When detecting that the operation force is applied to the trigger 17 and that the push lever 25 is pressed against the struck material 24, the controller 23 applies a voltage from the battery 22 to the electric motor 20 to rotate the electric motor 20 forward. Thus, the striking operation (first striking operation) by the striking portion 6 is started. The rotational force of the electric motor 20 is transmitted to the rotation shaft 46 via the speed reduction mechanism 27. Then, the rotation shaft 46 and the pin wheel 50 rotate counterclockwise in FIG. 8 (rotational direction E1), the first winding pin 51 of the pin wheel 50 and the first rack 61 of the driver blade 16 are engaged, and the winding of the driver blade 16 is started. Thereafter, with the rotation of the pin wheel 50 illustrated in FIG. 3, the winding pins 52 to 60 of the pin wheel 50 and the racks 62 to 70 of the driver blade 16 are sequentially engaged with each other, and the striking portion 6 is raised. At this time, as illustrated in FIG. 8, in the pin wheel 50, since the gap 80 is provided between each abutment pin and the winding pin on the downstream, when the driver blade 16 is wound up to the upper side, each rack of the driver blade 16 can be smoothly arranged in the gap 80 between the adjacent winding pins. When the striking portion 6 is raised, the gas pressure in the pressure accumulation chamber 13 rises. The rotational output of the electric motor 20 is decelerated and transmitted to the pin wheel 50 by the speed reduction mechanism 27 illustrated in FIG. 1, so that the rotation of the pin wheel 50 is decelerated and the rotational torque is secured.

By the rotation of the pin wheel 50, the final winding pin 60 in the rotational direction E1 of the pin wheel 50 illustrated in FIG. 3 and the final rack 70 of the driver blade 16 are engaged with each other, and the striking portion 6 is raised to the top dead center. Then, when the winding pin 60 of the pin wheel 50 is separated from the final rack 70 of the driver blade 16, the striking portion 6 falls at the gas pressure of the pressure accumulation chamber 13. That is, the position of the striking portion 6 at the time when the winding pin 60 is separated from the final rack 70 is the top dead center. When the striking portion 6 is lowered by the gas pressure in the pressure accumulation chamber 13, the driver blade 16 strikes one fastener 18 positioned in the ejection passage 9 illustrated in FIG. 1, and the fastener 18 is struck into the struck material 24. In the abutment pins 52*a* to 59*a* of the pin wheel 50, the positions of the outer peripheral portions of the abutment pins 52*a* to 59*a* are the same as the position of the outer peripheral portion of the winding pins 51 to 60 or the position inward from the position of the outer peripheral portion of the winding pins 51 to 60, so that the abutment pins 52*a* to 59*a* do not hinder the winding operation of the driver blade 16 or the lowering operation after the winding-up.

After the fastener 18 is struck into the struck material 24, the piston 11 collides with the damper 15 (reaches bottom dead center). The damper 15 elastically deforms by receiving a load in a direction along the center line A1 and absorbs a part of kinetic energy of the striking portion 6.

The controller 23 continues the rotation of the electric motor 20 even after the striking portion 6 strikes the fastener 18 and reaches the bottom dead center. Therefore, the pin wheel 50 rotates in the rotational direction E1, and the winding pin 51 approaches the rack 61 of the driver blade 16.

When the winding pin 51 is engaged (re-engaged) with the rack 61, the striking portion 6 is actuated (raised) from the bottom dead center toward the standby position by the rotational force of the pin wheel 50. At this time, the winding pin 52 engages with and separates from the rack 62, and the winding pin 53 engages with and separates from the rack 63. As described above, the pin of the pin wheel 50 and the rack of the driver blade 16 are sequentially engaged with and separated from each other, so that the driver blade 16 is pushed upward. Also at this time, in the pin wheel 50, each rack of the driver blade 16 can be smoothly arranged in the gap 80 between the adjacent winding pins.

When detecting that the striking portion 6 has reached the standby position, the controller 23 stops the electric motor 20 to stop the rotation of the pin wheel 50. Since the pin wheel 50 is connected to the one-way clutch mechanism by the one-way clutch 27*a* illustrated in FIG. 5, it is possible to maintain the striking portion 6 at the standby position without reverse rotation.

As described above, in the striking machine 1, in the normal winding operation of the driver blade 16, the pin wheel 50 rotates in the engagement state in which any one of the plurality of pins of the pin wheel 50 and any one of the plurality of racks of the driver blade 16 are engaged with each other, so that the driver blade 16 is pushed upward (toward the other side) in the vertical direction M1. That is, the driver blade 16 is pushed up in the return direction D2 by the rotation of the pin wheel 50 in the engagement state in which the pin and the rack are engaged.

Further, when the engagement state between the pin and the rack is released, the driver blade 16 moves to the lower side (one side) in the vertical direction M1. That is, the driver blade 16 is actuated in the striking direction D1, thereby striking the fastener 18.

In addition, the driver blade 16 is pushed up to the upper side (other side) in the vertical direction M1 by re-engagement of any of the plurality of pins and any of the plurality of racks to be in the engagement state as the pin wheel 50 rotates after the striking.

Next, in the striking machine 1 of the first embodiment, the striking operation of the driver blade at the time of the misalignment (second striking operation) illustrated in FIGS. 9 to 11 will be described. Here, in a case where the first winding pin 51 of the pin wheel 50 is engaged with any rack other than the first rack 61 of the driver blade 16 in the engagement between the driver blade 16 and the pin wheel 50 when the driver blade 16 is wound up, the winding operation of the driver blade 16 is referred to as a misalignment. That is, a case where the first winding pin 51 of the pin wheel 50 is engaged with any one of the racks 62 to 70 of the driver blade 16 illustrated in FIG. 3 is referred to as a misalignment.

For example, as illustrated in FIG. 9, the first winding pin 51 of the pin wheel 50 is engaged with the second rack 62 of the driver blade 16, and in this state, the pin wheel 50 rotates in the rotational direction E1, so that the first and subsequent pins of the pin wheel 50 and the second and subsequent racks of the driver blade 16 are sequentially engaged to push up the driver blade 16. This operation is a one-step misalignment operation which is an example of the misalignment operation (second striking operation) between the pin wheel 50 and the driver blade 16. Note that a larger step misalignment operation is also included in the misalignment operation, such as a two-step misalignment operation in which the winding pin 51 engages with the third rack 63 of the driver blade 16 and a three-step misalignment operation in which the winding pin 51 engages with the fourth rack 64 of the driver blade 16. In the misalignment operation, as illustrated in FIG. 10(*a*), the ninth winding pin 59 of the pin wheel 50 and the final rack 70 of the driver blade 16 are engaged with each other, and the final winding pin 60 remains on the pin wheel 50 side. In this state, when the driver blade 16 reaches the top dead center and the engagement between the winding pin 59 of the pin wheel 50 and the final rack 70 of the driver blade 16 ends, the final rack 70 is released at the next moment. That is, the driver blade 16 is released.

Figure 10:
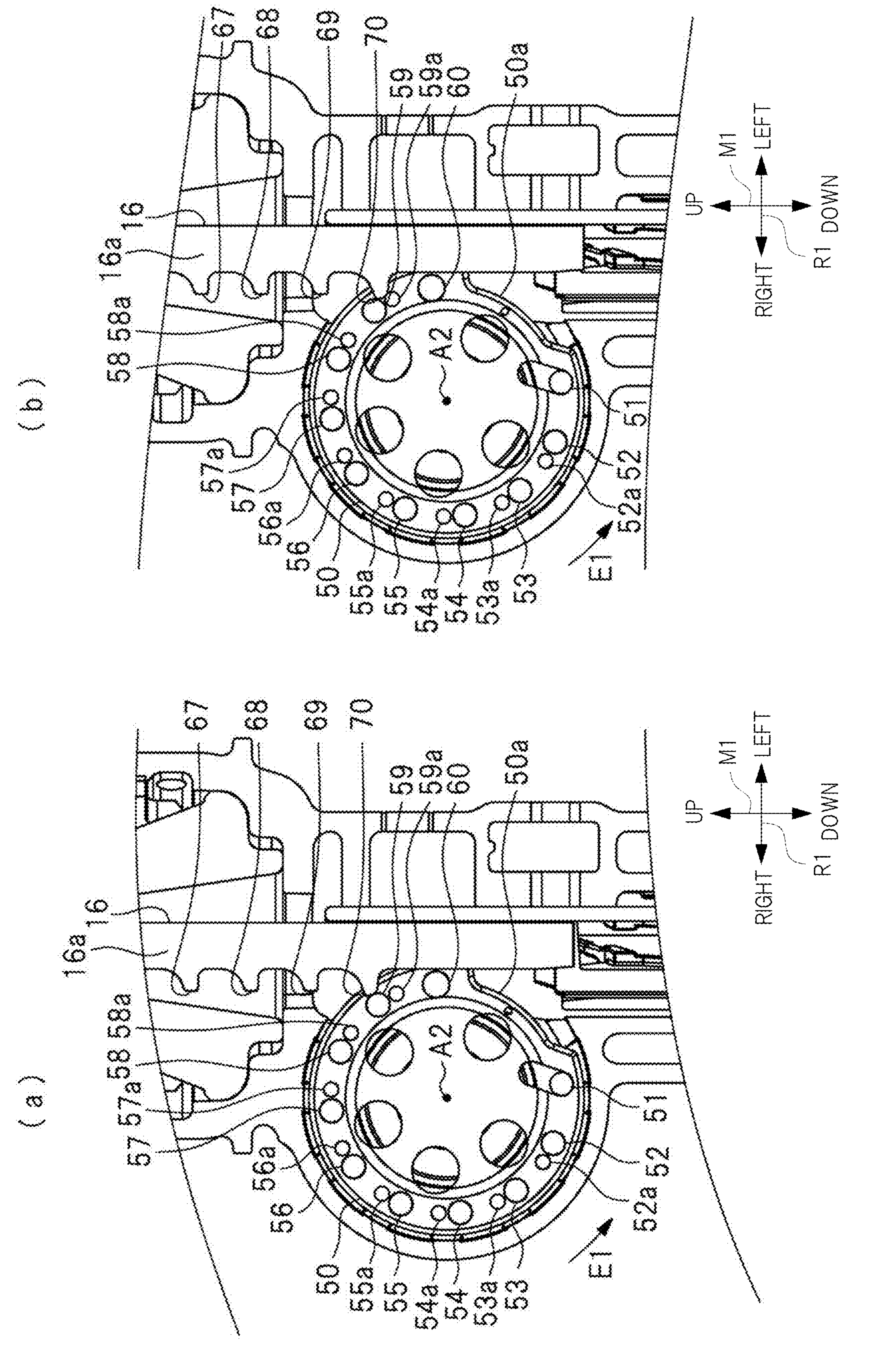
FIG. 10 is a partially enlarged view illustrating an engagement state between the rack and the pin in the winding operation when the misalignment occurs in FIG. 9, in which FIG. 10(*a*) is a state at the time of driver blade release, and FIG. 10(*b*) is a state at the time of a first collision in which a final rack collides with an abutment pin.

When the final rack 70 is released, the compressed air from the pressure accumulation chamber 13 illustrated in FIG. 1 lowers the driver blade 16 as illustrated in FIG. 10(*b*). Then, the final rack 70 of the driver blade 16 and the abutment pin 59*a* of the pin wheel 50 interfere with each other. The interference between the final rack 70 and the abutment pin 59*a* is referred to as first interference. In the first interference, the final rack 70 accelerated by the distance between the winding pin 59 and the abutment pin 59*a* interferes with the abutment pin 59*a*. At this time, in the pin wheel 50, since the abutment pin 59*a* is provided so that the distance between the winding pin 59 and the abutment pin 59*a* becomes short, the collision energy when the final rack 70 interferes with the abutment pin 59*a* is very small.

Thereafter, when the pin wheel 50 rotates in the rotational direction E1, the interference between the final rack 70 and the abutment pin 59*a* ends, and the driver blade 16 is lowered as illustrated in FIG. 11(*a*). Then, after the driver blade 16 is slightly lowered, the final rack 70 and the winding pin 60 of the pin wheel 50 are engaged with each other as illustrated in FIG. 11(*b*). The engagement between the final rack 70 and the winding pin 60 is referred to as second interference. In the second interference, the final rack 70 accelerated by the distance between the abutment pin 59*a* and the winding pin 60 is engaged with the winding pin 60. At this time, since the distance between the abutment pin 59*a* and the winding pin 60 is shorter than the distance between the winding pin 59 and the winding pin 60, energy when the rack 70 engages with the winding pin 60 is also relatively small.

In the case of the one-step misalignment operation, only the winding pin 60 among the winding pins 52 to 60 remains, and only the pin 59*a* among the abutment pins 52*a* to 59*a* of the pin wheel 50 interferes with the final rack 70 of the driver blade 16. In addition, in the case of the two-step misalignment operation, two of the winding pins 59 and 60 among the winding pins 52 to 60 remain, and two of the pins 58*a* and 59*a* among the abutment pins 52*a* to 59*a* of the pin wheel 50 sequentially interfere with the final rack 70. Further, in the case of the three-step misalignment operation, three of the winding pins 58, 59, and 60 among the winding pins 52 to 60 remain, and three of the pins 57*a*, 58*a*, and 59*a* among the abutment pins 52*a* to 59*a* of the pin wheel 50 interfere with the final rack 70. In order to cope with the multi-step misalignment operation as described above, not only the abutment pin 59*a* but also a plurality of gaps of the winding pins 52 to 60 are provided with the abutment pins.

After the final rack 70 is engaged with the winding pin 60, the rotation of the pin wheel 50 in the rotational direction E1 causes the winding pin 60 to scrape the final rack 70, and the driver blade 16 is released immediately thereafter, and the striking portion 6 is lowered by the gas pressure in the pressure accumulation chamber 13. When the striking portion 6 is lowered by the gas pressure in the pressure accumulation chamber 13, the driver blade 16 strikes one fastener 18 positioned in the ejection passage 9 illustrated in FIG. 1, and the fastener 18 is struck into the struck material 24.

After the fastener 18 is struck into the struck material 24, the piston 11 collides with the damper 15. The damper 15 elastically deforms by receiving a load in a direction along the center line A1 and absorbs a part of kinetic energy of the striking portion 6.

The controller 23 continues the rotation of the electric motor 20 even after the striking portion 6 strikes the fastener 18 and reaches the bottom dead center. Therefore, the pin wheel 50 rotates in the rotational direction E1, and the winding pin 51 approaches the rack 61 of the driver blade 16. When the winding pin 51 is engaged (re-engaged) with the rack 61, the striking portion 6 is actuated (raised) from the bottom dead center toward the standby position by the rotational force of the pin wheel 50. At this time, the winding pin 52 engages with and separates from the rack 62, and the winding pin 53 engages with and separates from the rack 63. As described above, the pin of the pin wheel 50 and the rack of the driver blade 16 are sequentially engaged with and separated from each other, so that the driver blade 16 is pushed upward. When detecting that the striking portion 6 has reached the standby position, the controller 23 stops the electric motor 20 to stop the rotation of the pin wheel 50. Since the pin wheel 50 is connected to the clutch mechanism by the one-way clutch 27*a* illustrated in FIG. 5, it is possible to maintain the striking portion 6 at the standby position without reverse rotation.

As described above, in the striking machine 1 according to the first embodiment, when a misalignment (second striking operation) occurs in the striking operation of the driver blade 16, the engagement of the final rack 70 with the final winding pin 60 can be divided into two stages. That is, when a misalignment occurs, energy when the final rack 70 is engaged with the final winding pin 60 can be divided into energy by the first interference and energy by the second interference. Specifically, as compared with the energy when the final rack 70 released from the winding pin 59 by the misalignment engages with the final winding pin 60, the energy when the final rack 70 engages with the winding pin 60 can be greatly reduced by dividing the engagement of the final rack 70 with the final winding pin 60 into two stages as in the striking machine 1 of the first embodiment. This makes it possible to reduce the load applied to the component. For example, the load applied to the speed reduction mechanism 27 can be reduced. As a result, it is possible to suppress a possibility that components such as gears are damaged in the speed reduction mechanism 27. In addition, the load applied to the final rack 70 of the driver blade 16 and the winding pin 60 of the pin wheel 50 can also be reduced, and the risk of damaging the final rack 70 and the winding pin 60 can also be suppressed.

Therefore, it is possible to reduce work such as replacement of components in the striking machine 1, and it is possible to improve convenience of the striking machine 1.

As illustrated in FIG. 11(*a*), the final rack 70 of the driver blade 16 is provided with a pressing surface 70*a* capable of pressing the abutment pins 52*a* to 59*a* toward the center of the pin wheel 50. Specifically, the final rack 70 has a shape in which an end portion on a side (right side) close to the center line A2 in a lower surface is obliquely cut out, and has a pressing surface 70*a* forming an acute angle with respect to a proximal end line 16*c* of the blade body portion 16*a*. As a result, the direction of the force applied from the final rack 70 to the abutment pin 59*a* at the time of the first interference can be set to the direction toward the center of the pin wheel 50 instead of the direction reverse to the rotational direction E1. As a result, the force for reversely rotating the pin wheel 50 can be suppressed from acting on the pin wheel 50, and the load applied to the speed reduction mechanism 27 can be further reduced. Although the other racks 61 to 69 are also provided with some inclined surfaces in manufacturing, the pressing surface 70*a* of the final rack 70 is larger than the inclined surfaces of the other racks.

Next, a modification of the first embodiment will be described. A first modification illustrated in FIG. 12 is a case where the support form of the abutment pins 52*a* to 59*a* is cantilever support in the pin wheel 50. In FIG. 12, the abutment pins 53*a* and 59*a* are illustrated as an example. That is, in each of the abutment pins 53*a* and 59*a*, the end portion T2 is supported by the pin wheel 50. On the other hand, the end portions T1 of the abutment pins 53*a* and 59*a* are not supported, and are cantilevered. That is, in the pin wheel 50, the support form of the abutment pins 52*a* to 59*a* may be cantilever support.

Next, a second modification illustrated in FIG. 13 illustrates a pin wheel 50 including a plurality of composite engagement portions. Specifically, as illustrated in FIG. 13(*a*), the pin wheel 50 is provided with a plurality of composite engagement portions 52*b* to 59*b*. The composite engagement portions 52*b* to 59*b* are pins in which the winding pins 51 to 60 and the abutment pins 52*a* to 59*a* illustrated in FIG. 4 are integrated, and a plurality of composite engagement portions 52*b* to 59*b* are provided in the rotational direction E1. A pin wheel 50 may be adopted, which includes a plurality of composite engagement portions 52*b* to 59*b* that are formed by integrating the winding pins 51 to 60 and the abutment pins 52*a* to 59*a* and are arranged in the rotational direction E1. By providing a plurality of the composite engagement portions 52*b* to 59*b*, it is possible to suppress complexity of the structure of the pin wheel 50.

Next, in a third modification illustrated in FIGS. 14 and 15, a structure in which the pin wheel 50 includes a gear 71 will be described. Specifically, this is an example in which the gear 71 is assembled to the pin wheel 50, and the wheel has a gear shape. The gear 71 has tooth portions 71*a* to 79*a* as the rotating portion side engagement portion. That is, as illustrated in FIG. 15, the pin wheel 50 is provided with a gear 71 including tooth portions 71*a* to 79*a* instead of the winding pins 51 to 60 illustrated in FIG. 4. Then, the abutment pins 52*a* to 59*a* are provided between adjacent tooth portions. Even when the pin wheel 50 having such a gear 71 is adopted, similarly to the pin wheel 50 of FIG. 4, the load applied to the speed reduction mechanism 27 can be reduced, and it is possible to suppress the possibility that parts such as gears in the speed reduction mechanism 27 are damaged.

Next, a fourth modification illustrated in FIGS. 16 to 18 describes a structure in which the abutment pins 52*a* to 59*a* are movable. As illustrated in FIG. 16(*a*), the pin wheel 50 is provided with the winding pins 51 to 60, and an arc-shaped guide hole 50*b* is formed between the pins. As illustrated in FIG. 17, one abutment pin is disposed in each of the guide holes 50*b*. The abutment pins 52*a* to 59*a* are provided in the guide holes 50*b* so as to be movable inward in the radial direction of the pin wheel 50. The abutment pins 52*a* to 59*a* are constantly biased outward in the radial direction of the pin wheel 50 by, for example, a leaf spring or the like.

Further, the abutment pins 52*a* to 59*a* are disposed at the center positions of the adjacent winding pins. By arranging the abutment pins 52*a* to 59*a* at the center between the adjacent winding pins in this manner, the distance by which the final rack 70 of the driver blade 16 accelerates can be shortened, and the energy when the final rack 70 engages with the winding pins 60 can be reduced. The acceleration distance of the final rack 70 can be minimized when the abutment pins 52*a* to 59*a* are disposed at the center between the adjacent winding pins.

Further, since the abutment pins 52*a* to 59*a* are movable, it is possible to prevent the abutment pins 52*a* to 59*a* from colliding with the final rack 70. For example, as illustrated in FIG. 18, when the abutment pin 59*a* abuts on the final rack 70, the abutment pin 59*a* moves inward. As a result, collision between the abutment pin 59*a* and the final rack 70 can be avoided. After the rack 70 passes, the abutment pin 59*a* is constantly biased to the radial outside of the pin wheel 50, and thus, returns to the center position between the winding pins. In this manner, collision between the abutment pin 59*a* and the final rack 70 can be avoided, and a load applied to the speed reduction mechanism 27 can be reduced.

(Second Embodiment) In a second embodiment, in the striking machine (working machine) 1 illustrated in FIG. 1, a second interference portion (interference portion) is provided in the pin wheel (rotating portion) 50, and a striking portion side interference portion capable of interfering with the second interference portion of the pin wheel 50 is provided in the driver blade (striking portion) 16.

As illustrated in FIG. 19, the pin wheel 50 has two disk portions 50*c* and 50*d* facing each other, and a plurality of rotating portion side engagement portions are provided so as to bridge the two disk portions 50*c* and 50*d*. The pin wheel 50 includes the winding pins 51 to 60 disposed along an outer peripheral portion of the pin wheel 50 as a plurality of rotating portion side engagement portions. Further, the pin wheel 50 is provided with a plurality of convex portions 50*e*, 50*f*, 50*g*, 50*h*, 50*i*, 50*j*, 50*k*, 50*m*, 50*n*, 50*p*, 50*q*, and 50*r* as an example of the second interference portion as illustrated in FIGS. 19 and 21 to 24. Hereinafter, the convex portions 50*e* to 50*r* represent the convex portions 50*e*, 50*f*, 50*g*, 50*h*, 50*i*, 50*j*, 50*k*, 50*m*, 50*n*, 50*p*, 50*q*, and 50*r*. The plurality of convex portions 50*e* to 50*r* are arranged at substantially equal intervals on the outer peripheral portion of each of the two disk portions 50*c* and 50*d*, and are provided so as to protrude from the disk portions 50*c* and 50*d* along the radial direction C1 of the disk portions 50*c* and 50*d* as illustrated in FIG. 21 on the outer peripheral portion of each of the disk portions 50*c* and 50*d*.

Specifically, the convex portions 50*e*, 50*f*, 50*g*, 50*h*, 50*i*, and 50*j* are provided at substantially equal intervals along the outer peripheral portion of the disk portion 50*c*. On the other hand, the convex portions 50*k*, 50*m*, 50*n*, 50*p*, 50*q*, and 50*r* are provided at substantially equal intervals along the outer peripheral portion of the disk portion 50*d*. The convex portions 50*e*, 50*f*, 50*g*, 50*h*, 50*i*, and 50*j* and the convex portions 50*k*, 50*m*, 50*n*, 50*p*, 50*q*, and 50*r* are provided at the same positions on the outer peripheral portions of the disk portions 50*c* and 50*d* in the disk portion 50*c* and the disk portion 50*d*, respectively.

The convex portions 50*e* to 50*r* are arranged at positions different from the plurality of winding pins 51 to 60 in the radial direction C1 of the pin wheel 50. Specifically, the convex portions 50*e* to 50*r* are disposed outside (outward) the plurality of winding pins 51 to 60 in the radial direction C1 of the pin wheel 50.

As illustrated in FIG. 19, the convex portions 50*e* to 50*r* are arranged at positions different from the plurality of winding pins 51 to 60 in the axial direction B1 of the pin wheel 50. Specifically, while the plurality of winding pins 51 to 60 are provided so as to bridge the two disk portions 50*c* and 50*d* as described above, the convex portions 50*e*, 50*f*, 50*g*, 50*h*, 50*i*, and 50*j* are provided on the outer peripheral side surface of the disk portion 50*c*, and the convex portions 50*k*, 50*m*, 50*n*, 50*p*, 50*q*, and 50*r* are also provided on the outer peripheral side surface of the disk portion 50*d*.

In other words, in the axial direction B1 of the pin wheel 50, the plurality of winding pins 51 to 60 are disposed at positions between the plurality of convex portions 50*e*, 50*f*, 50*g*, 50*h*, 50*i*, and 50*j* and the plurality of convex portions 50*k*, 50*m*, 50*n*, 50*p*, 50*q*, and 50*r*.

Note that the convex portions 50*e*, 50*f*, 50*g*, 50*h*, 50*i*, and 50*j* are formed integrally with the disk portion 50*c*, and are arranged on the same circumference centered on the center line A2. Similarly, the convex portions 50*k*, 50*m*, 50*n*, 50*p*, 50*q*, and 50*r* are also formed integrally with the disk portion 50*d*, and are arranged on the same circumference centered on the center line A2.

The convex portions 50*e* to 50*r* are interference portions that do not interfere with the racks 61 to 70 of the driver blade 16 in a normal striking operation (first striking operation) in which the driver blade 16 moves downward in the vertical direction M1 by the biasing force of the compressed air stored in the pressure accumulation chamber 13 illustrated in FIG. 1 to strike the fastener 18. That is, the convex portions 50*e* to 50*r* are interference portions that do not interfere with the racks 61 to 70 of the driver blade 16 in a normal striking operation (first striking operation) in which all of the plurality of racks 61 to 70 of the driver blade 16 are engaged with the winding pins 51 to 60 of the pin wheel 50.

Further, the convex portions 50*e* to 50*r* do not interfere with the plurality of racks 61 to 70 of the driver blade 16 even in the abnormal striking operation (second striking operation) due to a misalignment. That is, the convex portions 50*e* to 50*r* do not interfere with the racks 61 to 70 of the driver blade 16 even in an abnormal striking operation (second striking operation) due to a misalignment in which a part of the plurality of racks 61 to 70 of the driver blade 16 is not engaged with the winding pins 51 to 60 of the pin wheel 50.

In other words, the convex portions 50*e* to 50*r* of the pin wheel 50 of the second embodiment interfere with another portion of the driver blade 16 (convex portion of driver blade 16 to be described below) in the abnormal striking operation (second striking operation) due to a misalignment.

Here, the conditions of the installation positions of the convex portions 50*e* to 50*r* on the pin wheel 50 will be described. The convex portions 50*e* to 50*r* of the pin wheel 50 are on condition that the convex portions 16*d* and 16*e* of the driver blade 16 and the convex portions 50*e* to 50*r* of the pin wheel 50 come into contact with each other before the time point at which the rack of the driver blade 16 collides with the winding pin of the pin wheel 50 when the driver blade 16 is released downward in the vertical direction M1 at the time of occurrence of the misalignment.

Note that the installation positions of the convex portions 50*e* to 50*r* of the pin wheel 50 are preferably such that, as illustrated in FIG. 21, a top portion 50*s* of a convex portion provided on the outer peripheral portion of the pin wheel 50 and disposed closest to the driver blade 16 among the plurality of convex portions 50*e* to 50*j* is disposed closer to the driver blade 16 than a virtual perpendicular line G1 in contact with a virtual circumscribed circle F1 of the winding pins 51 to 60. Further, among the plurality of convex portions 50*e* to 50*j*, the top portion 50*s* of the convex portion disposed closest to the driver blade 16 is located closer to the rack arrangement side than the end portion 16*f* of the driver blade 16.

For example, when the convex portions 50*e* to 50*j* of the pin wheel 50 are arranged at positions (for example, front side in front-rear direction N1) shifted along the axial direction B1 (see FIG. 19) of the pin wheel 50 from the condition of the installation position, it is necessary to extend the convex portion 16*d* of the driver blade 16 along the axial direction B1 so as to correspond thereto. As a result, the size of the ejection portion 8 in which the fastener 18 is disposed increases, and the shape of the portion to be loaded with the fastener 18 becomes complicated.

In addition, when the convex portion 50*i* of the pin wheel 50 of FIG. 21 is provided in a direction in which the top portion 50*s* is farther away from the driver blade 16 than the virtual perpendicular line G1 (inward in radial direction with center line A2 as center), the convex portion 16*d* of the driver blade 16 needs to protrude toward the pin wheel 50 than the blade body portion 16*a*. As a result, as described above, the size of the ejection portion 8 in which the fastener 18 is disposed increases, and the shape of the portion to be loaded with the fastener 18 becomes complicated.

Furthermore, when the convex portion 50*i* of the pin wheel 50 is provided such that the top portion 50*s* thereof protrudes outward in the radial direction centered on the center line A2 from the end portion 16*f* of the driver blade 16, the convex portion 16*d* of the driver blade 16 also needs to protrude from the end portion 16*f* of the blade body portion 16*a*. As a result, as described above, the size of the ejection portion 8 in which the fastener 18 is disposed increases, and the shape of the portion to be loaded with the fastener 18 becomes complicated.

Therefore, the condition of the installation positions of the convex portions 50*e* to 50*r* of the pin wheel 50 is that, when the driver blade 16 is released downward in the vertical direction M1 at the time of occurrence of the misalignment, the convex portions 16*d* and 16*e* of the driver blade 16 and the convex portions 50*e* to 50*r* of the pin wheel 50 come into contact with each other before the time point at which the rack of the driver blade 16 collides with the winding pin of the pin wheel 50.

Next, the interference portion (the other portion) of the driver blade 16 that interferes with the convex portions 50*e* to 50*r* of the pin wheel 50 in the striking operation (second striking operation) due to the misalignment will be described. As illustrated in FIGS. 19 to 21, the driver blade 16 includes convex portions (striking portion side interference portions) 16*d* and 16*e* that interfere with the convex portions 50*e* to 50*r* of the pin wheel 50 in the striking operation (second striking operation) due to the above-described misalignment. As illustrated in FIG. 20, the convex portion (striking portion side interference portion) 16*d* is provided on one side surface of the blade body portion 16*a* of the driver blade 16, and the convex portion (striking portion side interference portion) 16*e* is provided on the other side surface opposite to the one side surface of the blade body portion 16*a*. Further, the convex portion 16*d* and the convex portion 16*e* are provided at the same position (height) in the vertical direction M1 of the blade body portion 16*a*.

The convex portion 16*d* of the driver blade 16 is engaged with the convex portions 50*e*, 50*f*, 50*g*, 50*h*, 50*i*, 50*j* of the pin wheel 50 in an abnormal striking operation (second striking operation) due to a misalignment. On the other hand, the convex portion 16*e* of the driver blade 16 is engaged with the convex portions 50*k*, 50*m*, 50*n*, 50*p*, 50*q*, and 50*r* of the pin wheel 50 in an abnormal striking operation (second striking operation) due to a misalignment.

The convex portions 16*d* and 16*e* of the driver blade 16 are disposed on the lower side (one side) in the vertical direction M1 with respect to the plurality of racks 61 to 70 in the blade body portion 16*a*. Specifically, the convex portions 16*d* and 16*e* are provided at positions between the rack 70 disposed on the lowermost side of the blade body portion 16*a* and the tip end 16*b*, and are preferably provided at positions close to the rack 70 at positions between the rack 70 and the tip end 16*b*.

As illustrated in FIG. 19, the convex portions 16*d* and 16*e* of the driver blade 16 are disposed at positions separated from the rotation shaft 46 of the pin wheel 50 than the plurality of racks 61 to 70 in the left-right direction (second direction) R1 orthogonal to the vertical direction M1. In other words, the plurality of racks 61 to 70 are provided at the edge portion of the blade body portion 16*a* of the driver blade 16 on the side close to the rotation shaft 46 in the left-right direction R1, while the convex portions 16*d* and 16*e* are provided near the edge portion of the blade body portion 16*a* on the side far from the rotation shaft 46 in the left-right direction R1.

As a result, the convex portions 16*d* and 16*e* do not interfere with (engage with) the winding pins 51 to 60 of the pin wheel 50 in the normal striking operation (first striking operation) of the striking portion 6, and interfere with (engage with) the convex portions 50*e* to 50*r* of the pin wheel 50 only in the abnormal striking operation (second striking operation) due to the misalignment of the striking portion 6.

Here, the conditions of the installation positions of the convex portions 16*d* and 16*e* in the driver blade 16 will be described. It is a condition that the convex portions 16*d* and 16*e* are provided at positions not in contact with the convex portions 50*e* to 50*r* of the pin wheel 50 when the driver blade 16 is wound up, and are arranged below the winding pin 60 (ejection port side) when the final winding pin 60 and the final rack 70 of the driver blade 16 are engaged with each other.

As illustrated in FIGS. 19 and 21, the convex portions 16*d* and 16*e* of the driver blade 16 are preferably provided so as to protrude within the range of the blade body portion 16*a* in the left-right direction R1 and along the axial direction B1 of the pin wheel 50.

For example, if the convex portions 16*d* and 16*e* of the driver blade 16 are provided so as to protrude from the blade body portion 16*a* in the left-right direction R1, the size of the ejection portion 8 where the fastener 18 is disposed becomes large, and the shape of the portion where the fastener 18 is loaded becomes complicated.

Therefore, the condition of the installation positions of the convex portions 16*d* and 16*e* of the driver blade 16 is that the convex portions 16*d* and 16*e* are provided at positions not in contact with the convex portions 50*e* to 50*r* of the pin wheel 50 when the driver blade 16 is wound up, and are arranged below the winding pin 60 (ejection port side) when the final winding pin 60 and the final rack 70 of the driver blade 16 are engaged with each other.

In addition, it is preferable that the blade movement amount until the convex portion of the driver blade 16 comes into contact with the convex portion of the pin wheel 50 after the rack of the driver blade 16 is detached from the winding pin of the pin wheel 50 is equal to the blade movement amount until the rack of the driver blade 16 comes into contact with the winding pin of the pin wheel 50 after the convex portion of the driver blade 16 is detached from the convex portion of the pin wheel 50. As a result, the load is not biased to either the winding pin or the convex portion of the pin wheel 50, so that the life of the pin wheel 50 can be extended.

Next, an example of the striking operation of the striking machine 1 of the second embodiment will be described. First, a normal striking operation (first striking operation) of the driver blade 16 of the second embodiment will be described. The normal striking operation (first striking operation) of the driver blade 16 of the second embodiment is similar to the striking operation (first striking operation) described in the first embodiment. That is, when detecting that the operation force is applied to the trigger 17 and that the push lever 25 is pressed against the struck material 24, the controller 23 illustrated in FIG. 1 applies a voltage from the battery 22 to the electric motor 20 to rotate the electric motor 20 forward. Thus, the striking operation (first striking operation) by the striking portion 6 is started.

The rotation shaft 46 and the pin wheel 50 rotate in a rotational direction E1 illustrated in FIG. 19, the first winding pin 51 of the pin wheel 50 and the first rack 61 of the driver blade 16 illustrated in FIG. 20 are engaged with each other, and the winding-up of the driver blade 16 is started. Thereafter, with the rotation of the pin wheel 50, the winding pin 52 to 60 of the pin wheel 50 and the rack 62 to 70 of the driver blade 16 are sequentially engaged with each other, and the striking portion 6 is raised. At this time, as illustrated in FIGS. 19 to 27, the plurality of winding pins 51 to 60 are disposed at positions between the plurality of convex portions 50*e*, 50*f*, 50*g*, 50*h*, 50*i*, and 50*j* and the plurality of convex portions 50*k*, 50*m*, 50*n*, 50*p*, 50*q*, and 50*r* in the axial direction B1 of the pin wheel 50. That is, the convex portions 50*e* to 50*r* of the pin wheel 50 are arranged at positions different from the plurality of winding pins 51 to 60 in the axial direction B1 of the pin wheel 50. Therefore, in the normal striking operation (first striking operation) of the driver blade 16, the convex portions 50*e* to 50*r* of the pin wheel 50 do not engage with the rack 62 to 70 of the driver blade 16. Further, in the normal winding operation of the driver blade 16, the convex portions 50*e* to 50*r* of the pin wheel 50 do not engage with the convex portions 16*d* and 16*e* of the driver blade 16.

By the rotation of the pin wheel 50 in the rotational direction E1, the final winding pin 60 in the rotational direction E1 of the pin wheel 50 is engaged with the final rack 70 of the driver blade 16, and the striking portion 6 is raised to the top dead center. Thereafter, when the winding pin 60 of the pin wheel 50 is separated from the final rack

70 of the driver blade 16, the striking portion 6 is lowered by the gas pressure in the pressure accumulation chamber 13. Then, when the striking portion 6 is lowered by the gas pressure in the pressure accumulation chamber 13, the driver blade 16 strikes one fastener 18 positioned in the ejection passage 9 illustrated in FIG. 1, and the fastener 18 is struck into the struck material 24.

After the fastener 18 is struck into the struck material 24, the piston 11 collides with the damper 15 (reaches bottom dead center). The controller 23 continues the rotation of the electric motor 20 even after the striking portion 6 strikes the fastener 18 and reaches the bottom dead center. Therefore, the pin wheel 50 rotates in the rotational direction E1, and the winding pin 51 approaches the rack 61 of the driver blade 16.

When the winding pin 51 is engaged (re-engaged) with the rack 61, the striking portion 6 is actuated (raised) from the bottom dead center toward the standby position by the rotational force of the pin wheel 50. At this time, the winding pin 52 engages with and separates from the rack 62, and the winding pin 53 engages with and separates from the rack 63. As described above, the pin of the pin wheel 50 and the rack of the driver blade 16 are sequentially engaged with and separated from each other, so that the driver blade 16 is pushed upward.

When detecting that the striking portion 6 has reached the standby position, the controller 23 stops the electric motor 20 to stop the rotation of the pin wheel 50. Since the pin wheel 50 is connected to the one-way clutch mechanism by the one-way clutch 27*a* illustrated in FIG. 5, it is possible to maintain the striking portion 6 at the standby position without reverse rotation.

Next, the engagement state between the pin wheel 50 and the driver blade 16 when the one-step misalignment occurs will be described with reference to FIGS. 22 to 25. The one-step misalignment is an operation in which, in the winding operation of the driver blade 16, the first winding pin 51 of the pin wheel 50 illustrated in FIG. 19 is engaged with the second rack 62 of the driver blade 16 in FIG. 20, and in this state, the pin wheel 50 rotates in the rotational direction E1, so that the first and subsequent pins of the pin wheel 50 and the second and subsequent racks of the driver blade 16 are sequentially engaged. With this operation, the driver blade 16 is pushed up toward the top dead center. This operation is a one-step misalignment operation which is an example of the misalignment operation (second striking operation) between the pin wheel 50 and the driver blade 16. Note that a larger step misalignment operation is also included in the misalignment operation, such as a two-step misalignment operation in which the winding pin 51 engages with the third rack 63 of the driver blade 16 and a three-step misalignment operation in which the winding pin 51 engages with the fourth rack 64 of the driver blade 16.

In the one-step misalignment operation, as illustrated in FIG. 22, the ninth winding pin 59 of the pin wheel 50 and the final rack 70 of the driver blade 16 are engaged with each other, and the final winding pin 60 remains on the pin wheel 50 side. In this state, when the driver blade 16 reaches the top dead center and the engagement between the winding pin 59 of the pin wheel 50 and the final rack 70 of the driver blade 16 ends, the final rack 70 is released at the next moment as illustrated in FIG. 23. That is, the driver blade 16 is released.

When the final rack 70 is released, the compressed air from the pressure accumulation chamber 13 illustrated in FIG. 1 lowers the driver blade 16 as illustrated in FIG. 23(*a*). The convex portion 50*j* (50*r*) of the pin wheel 50 and the convex portion 16*d* (16*e*) of the driver blade 16 interfere with each other. That is, the convex portion 50*j* of the pin wheel 50 and the convex portion 16*d* of the driver blade 16 interfere with each other, and the convex portion 50*r* of the pin wheel 50 and the convex portion 16*e* of the driver blade 16 interfere with each other. The interference between the convex portion 50*j* (50*r*) of the pin wheel 50 and the convex portion 16*d* (16*e*) of the driver blade 16 is referred to as first interference. In the first interference, the convex portion 16*d* of the driver blade 16 accelerated by a distance between the convex portion 50*j* and the convex portion 16*d* (distance between convex portion 50*r* and convex portion 16*e*) interferes with the convex portion 50*j* of the pin wheel 50 (convex portion 16*e* interferes with convex portion 50*r*). At this time, in the pin wheel 50 and the driver blade 16, the convex portion 50*j* and the convex portion 16*d* are provided so that the distance between the convex portion 50*j* and the convex portion 16*d* is shortened, and the convex portion 50*r* and the convex portion 16*e* are provided so that the distance between the convex portion 50*r* and the convex portion 16*e* is shortened. Therefore, the collision energy when the convex portion 16*d* interferes with the convex portion 50*j* (convex portion 16*e* interferes with convex portion 50*r*) is very small.

Thereafter, when the pin wheel 50 rotates in the rotational direction E1, the interference between the convex portion 16*d* and the convex portion 50*j* (convex portion 16*e* and convex portion 50*r*) ends, and the driver blade 16 is released and lowered as illustrated in FIG. 24. Then, after the driver blade 16 is slightly lowered, the final rack 70 and the winding pin 60 of the pin wheel 50 are engaged with each other. The engagement between the final rack 70 and the winding pin 60 is referred to as second interference. In the second interference, the final rack 70 accelerated by the distance between the convex portion 50*j* (convex portion 50*r*) and the winding pin 60 is engaged with the winding pin 60. At this time, since the distance between the convex portion 50*j* (convex portion 50*r*) and the winding pin 60 is shorter than the distance between the winding pin 59 and the winding pin 60, energy when the rack 70 engages with the winding pin 60 is also relatively small.

In the case of the one-step misalignment operation, only the winding pin 60 among the winding pins 52 to 60 remains, and only the convex portion 50*j* (convex portion 50*r*) out of the convex portions 50*e* to 50*j* (convex portions 50*k* to 50*r*) of the pin wheel 50 interferes with the convex portion 16*d* (convex portion 16*e*) of the driver blade 16. In addition, in the case of a two-step difference operation to be described below, two of the winding pins 59 and 60 of the winding pins 52 to 60 remain, and two of the convex portions 50*i* and 50*j* (convex portions 50*q* and 50*r*) of the convex portions 50*e* to 50*j* (convex portions 50*k* to 50*r*) of the pin wheel 50 sequentially interfere with the convex portion 16*d* (convex portion 16*e*). Further, in the case of the three-step misalignment operation, three of the winding pins 58, 59, and 60 among the winding pins 52 to 60 remain, and three of the convex portions 50*h*, 50*i*, and 50*j* (convex portions 50*p*, 50*q*, and 50*r*) among the convex portions 50*e* to 50*j* (convex portions 50*k* to 50*r*) of the pin wheel 50 interfere with the convex portion 16*d* (convex portion 16*e*). In order to cope with such multi-step misalignment operation, not only the convex portion 50*j* (convex portion 50*r*) but also a plurality of convex portions (second interference portions) are provided on the outer peripheral portion of the disk portion 50*c* (disk portion 50*d*).

After the final rack 70 is engaged with the winding pin 60, the rotation of the pin wheel 50 in the rotational direction E1 causes the winding pin 60 to scrape the final rack 70, and the driver blade 16 is released immediately thereafter. As illustrated in FIG. 25, the driver blade 16 is lowered by the gas pressure in the pressure accumulation chamber 13. When the striking portion 6 is lowered by the gas pressure in the pressure accumulation chamber 13, the driver blade 16 strikes one fastener 18 positioned in the ejection passage 9 illustrated in FIG. 1, and the fastener 18 is struck into the struck material 24.

After the fastener 18 is struck into the struck material 24, the piston 11 collides with the damper 15 and reaches the bottom dead center. The controller 23 continues the rotation of the electric motor 20 even after the striking portion 6 strikes the fastener 18 and reaches the bottom dead center. Therefore, the pin wheel 50 rotates in the rotational direction E1, and the winding pin 51 approaches the rack 61 of the driver blade 16. When the winding pin 51 is engaged (re-engaged) with the rack 61, the striking portion 6 is actuated (raised) from the bottom dead center toward the standby position by the rotational force of the pin wheel 50. At this time, the winding pin 52 engages with and separates from the rack 62, and the winding pin 53 engages with and separates from the rack 63. As described above, the pin of the pin wheel 50 and the rack of the driver blade 16 are sequentially engaged with and separated from each other, so that the driver blade 16 is pushed upward. When detecting that the striking portion 6 has reached the standby position, the controller 23 stops the electric motor 20 to stop the rotation of the pin wheel 50. Since the pin wheel 50 is connected to the clutch mechanism by the one-way clutch 27*a* illustrated in FIG. 5, it is possible to maintain the striking portion 6 at the standby position without reverse rotation.

Next, the engagement state between the pin wheel 50 and the driver blade 16 when the two-step misalignment occurs will be described.

In the two-step misalignment operation, as illustrated in FIG. 26, the eighth winding pin 58 of the pin wheel 50 and the final rack 70 of the driver blade 16 are engaged, and the ninth winding pin 59 and the final winding pin 60 remain on the pin wheel 50 side. In this state, when the driver blade 16 reaches the top dead center and the engagement between the winding pin 58 of the pin wheel 50 and the final rack 70 of the driver blade 16 ends, the final rack 70 is released at the next moment as illustrated in FIG. 27(*a*). That is, the driver blade 16 is released.

When the final rack 70 is released, the compressed air from the pressure accumulation chamber 13 illustrated in FIG. 1 lowers the driver blade 16. As illustrated in FIG. 27(*b*), the convex portion 50*i* (50*q*) of the pin wheel 50 and the convex portion 16*d* (16*e*) of the driver blade 16 interfere with each other. That is, the convex portion 50*i* of the pin wheel 50 and the convex portion 16*d* of the driver blade 16 interfere with each other, and the convex portion 50*q* of the pin wheel 50 and the convex portion 16*e* of the driver blade 16 interfere with each other. The interference between the convex portion 50*i* (50*q*) of the pin wheel 50 and the convex portion 16*d* (16*e*) of the driver blade 16 is referred to as first interference. In the first interference, the convex portion 16*d* of the driver blade 16 accelerated by the distance between the convex portion 50*i* and the convex portion 16*d* (distance between convex portion 50*q* and convex portion 16*e*) interferes with the convex portion 50*i* of the pin wheel 50 (convex portion 16*e* interferes with convex portion 50*q*). At this time, in the pin wheel 50 and the driver blade 16, the convex portion 50*i* and the convex portion 16*d* are provided so that the distance between the convex portion 50*i* and the convex portion 16*d* is shortened, and the convex portion 50*q* and the convex portion 16*e* are provided so that the distance between the convex portion 50*q* and the convex portion 16*e* is shortened. Therefore, collision energy when the convex portion 16*d* interferes with the convex portion 50*i* (convex portion 16*e* interferes with convex portion 50*q*) is very small.

Thereafter, when the pin wheel 50 rotates in the rotational direction E1, the interference between the convex portion 16*d* and the convex portion 50*i* (convex portion 16*e* and convex portion 50*q*) ends, and the driver blade 16 is released and lowered. Then, after the driver blade 16 is slightly lowered, the ninth winding pin 59 of the pin wheel 50 and the final rack 70 of the driver blade 16 are engaged with each other, and the final winding pin 60 remains on the pin wheel 50 side.

Thereafter, the same operation as the one-step misalignment operation illustrated in FIGS. 22 to 25 is repeated, and the final rack 70 and the winding pins 60 of the pin wheel 50 are engaged with each other as illustrated in FIG. 24. In the two-step misalignment operation, interference between the convex portion 50*j* (50*r*) of the pin wheel 50 illustrated in FIG. 23 and the convex portion 16*d* (16*e*) of the driver blade 16 is referred to as second interference. In the second interference, the convex portion 16*d* of the driver blade 16 accelerated by the distance between the convex portion 50*j* and the convex portion 16*d* (distance between the convex portion 50*r* and the convex portion 16*e*) interferes with the convex portion 50*j* of the pin wheel 50 (convex portion 16*e* interferes with convex portion 50*r*). At this time, in the pin wheel 50 and the driver blade 16, the convex portion 50*j* and the convex portion 16*d* are provided so that the distance between the convex portion 50*j* and the convex portion 16*d* is shortened, and the convex portion 50*r* and the convex portion 16*e* are provided so that the distance between the convex portion 50*r* and the convex portion 16*e* is shortened. Therefore, the collision energy when the convex portion 16*d* interferes with the convex portion 50*j* (convex portion 16*e* interferes with convex portion 50*r*) is very small.

In the two-step misalignment operation, the engagement between the final rack 70 and the winding pin 60 illustrated in FIG. 24 is referred to as third interference. In the third interference, the final rack 70 accelerated by the distance between the convex portion 50*j* (convex portion 50*r*) and the winding pin 60 is engaged with the winding pin 60. At this time, since the distance between the convex portion 50*j* (convex portion 50*r*) and the winding pin 60 is shorter than the distance between the winding pin 59 and the winding pin 60, energy when the rack 70 engages with the winding pin 60 is also relatively small.

As described above, also in the second embodiment, when the misalignment (second striking operation) occurs in the striking operation of the driver blade 16, the engagement of the final rack 70 with the final winding pin 60 can be divided into two stages or three stages. That is, when a misalignment occurs, energy when the final rack 70 is engaged with the final winding pin 60 can be divided into energy by the first interference and energy by the second interference. Alternatively, the energy can be divided into energy by the first interference, energy by the second interference, and energy by the third interference. Specifically, as compared with the energy when the final rack 70 released from the winding pin 59 by the misalignment engages with the final winding pin 60, the energy when the final rack 70 engages with the winding pin 60 can be greatly reduced by dividing the engagement of the final rack 70 with the final winding pin 60 into two or three stages as in the second embodiment.

Accordingly, also in the striking machine 1 of the second embodiment, it is possible to reduce the load applied to the components. For example, the load applied to the speed reduction mechanism 27 can be reduced. As a result, it is possible to suppress a possibility that components such as gears are damaged in the speed reduction mechanism 27. In addition, the load applied to the final rack 70 of the driver blade 16 and the winding pin 60 of the pin wheel 50 can also be reduced, and the risk of damaging the final rack 70 and the winding pin 60 can also be suppressed.

Therefore, also in the striking machine 1 of the second embodiment, it is possible to reduce work such as replacement of parts, and it is possible to improve convenience of the striking machine 1.

In addition, the striking machine 1 according to the second embodiment can relax restrictions on the installation positions of the convex portions 50*e* to 50*j* (convex portions 50*k* to 50*r*) of the pin wheel 50 as compared with the striking machine 1 according to the first embodiment. That is, in the striking machine 1 of the first embodiment, regarding the installation positions of the abutment pins (first interference portions) 52*a* to 59*a*, when the driver blade 16 is wound up, a space for allowing the rack of the driver blade 16 to enter between the pins of the adjacent winding pins is required. In order to secure this space, the striking machine 1 of the first embodiment has a constraint that the abutment pin is provided near the winding pin on the upstream of the adjacent winding pins.

On the other hand, in the striking machine 1 of the second embodiment, the installation positions of the convex portions 50*e* to 50*j* (convex portions 50*k* to 50*r*) of the pin wheel 50 are not limited as in the striking machine 1 of the first embodiment. Therefore, in the striking machine 1 of the second embodiment, it is possible to relax the restriction on the installation positions of the convex portions 50*e* to 50*j* (convex portions 50*k* to 50*r*).

In the striking machine 1 according to the second embodiment, the convex portions 50*e* to 50*j* (convex portions 50*k* to 50*r*) of the pin wheel 50 are preferably disposed on the outer peripheral portion of the disk portion 50*c* (50*d*) so that the convex portions 50*e* to 50*j* (convex portions 50*k* to 50*r*) of the pin wheel 50 and the convex portion 16*d* (16*e*) of the driver blade 16 interfere with each other at the center between the adjacent pins of the winding pins 51 to 60 of the pin wheel 50. In this case, the energy when the final rack 70 of the driver blade 16 collides with the final winding pin 60 of the pin wheel 50 can be minimized.

In addition, in the striking machine 1 of the second embodiment, the convex portion 16*d* (16*e*) of the driver blade 16 does not interfere with the convex portions 50*e* to 50*j* (convex portions 50*k* to 50*r*) of the pin wheel 50 at the time of normal winding up of the driver blade 16, and only interferes with the convex portions 50*e* to 50*j* (convex portions 50*k* to 50*r*) of the pin wheel 50 at the time of occurrence of a misalignment. Therefore, the racks 61 to 70 of the driver blade 16 interfere with the winding pins 51 to 60 of the pin wheel 50 only during normal winding. As a result, damage to the racks 61 to 70 of the driver blade 16 and the winding pins 51 to 60 of the pin wheel 50 can be suppressed.

Next, a modification of the second embodiment will be described. In a fifth modification illustrated in FIG. 28, the outer diameter of the entire pin wheel 50 is increased, and instead of the convex portions 50*e* to 50*j* (convex portions 50*k* to 50*r*) described above, a concave portion 50*t* into which the convex portion 16*d* of the driver blade 16 is fitted is provided on the outer peripheral portion of the pin wheel 50 as the second interference portion.

As a result, similarly to the effect obtained by providing the convex portions 50*e* to 50*j* (convex portions 50*k* to 50*r*), it is possible to reduce the load applied to the component, and it is possible to suppress the possibility that the component such as the gear is damaged in the speed reduction mechanism 27. In addition, the load applied to the final rack 70 of the driver blade 16 and the winding pin 60 of the pin wheel 50 can also be reduced, and the risk of damaging the final rack 70 and the winding pin 60 can also be suppressed. As a result, also in the fifth modification, it is possible to reduce work such as replacement of parts, and it is possible to improve convenience of the striking machine 1.

The present invention is not limited to the above embodiment, and various modifications can be made without departing from the gist of the present invention.

EXPLANATION OF REFERENCE CHARACTERS

1 Striking machine (working machine)
2 Housing
3 Cylinder case
4 Motor case
5 Handle
6 Striking portion
7 Coupling portion
8 Ejection portion
9 Ejection passage
10 Cylinder
11 Piston
12 Piston chamber
13 Pressure accumulation chamber (biasing portion)
14 Pressure accumulation container
15 Damper
16 Driver blade
16*a* Blade body portion
16*b* Tip end
16*c* Proximal end line
16*d*, 16*e* Convex portion (striking portion side interference portion)
17 Trigger
17*a* Trigger sensor
18 Fastener
19 Magazine
20 Electric motor (motor)
21 Output shaft
22 Battery
23 Controller (control unit)
24 Struck material
25 Push lever
26 Nose portion
27 Speed reduction mechanism
27*a* One-way clutch
27*b* Inner ring
27*c* Outer ring
27*d* Pin member
27*e* Sun gear
27*f* Internal gear
27*g* Planetary gear
27*h* Gap
28 Wind-up mechanism
29 Mounting portion
30 Cap
31 Holder
32 Head cover

33 Damper support portion
34 Cylindrical portion
35 Seal member
36 Guide hole
39 Rotor
40 Stator
41 Motor substrate
42 Bearing
43 Gear case
44 Power transmission shaft
45 Bearing
46 Rotation shaft
47 Output element
48, 49 Bearing
50 Pin wheel (rotating portion)
50*a* Notch
50*b* Guide hole
50*c*, 50*d* Disk portion
50*e*, 50*f*, 50*g*, 50*h*, 50*i*, 50*j*, 50*k*, 50*m*, 50*n*, 50*p*, 50*q*, 50*r* Convex portion (interference portion, second interference portion)
50*s* Top portion
50*t* Concave portion (interference portion, second interference portion)
51, 52, 53, 54, 55, 56, 57, 58, 59, 60 Winding pin (rotating portion side engagement portion)
52*a*, 53*a*, 54*a*, 55*a*, 56*a*, 57*a*, 58*a*, 59*a* Abutment pin (interference portion, first interference portion)
52*b*, 53*b*, 54*b*, 55*b*, 56*b*, 57*b*, 58*b*, 59*b* Composite engagement portion
61, 62, 63, 64, 65, 66, 67, 68, 69, 70 Rack (striking portion side engagement portion)
70*a* Pressing surface
71 Gear
71*a*, 72*a*, 73*a*, 74*a*, 75*a*, 76*a*, 77*a*, 78*a*, 79*a* Tooth portion
80 Gap
A1, A2 Center line
B1 Axial direction
C1 Radial direction
D1 Striking direction
D2 Return direction
E1 Rotational direction
F1 Virtual circumscribed circle
G1 Virtual perpendicular line
M1 Vertical direction (first direction)
N1 Front-rear direction
R1 Left-right direction (second direction)
T1, T2 End portion

The invention claimed is:

1. A working machine comprising:
a motor;
a striking portion capable of striking a fastener by moving to one side in a first direction;
a biasing portion that biases the striking portion to the one side in the first direction;
a rotating portion that rotates by a driving force of the motor and is engageable with and disengageable from the striking portion; and
a control unit that controls driving of the motor,
wherein the striking portion
includes a plurality of striking portion side engagement portions provided along the first direction,
moves from a standby position to another side in the first direction when the rotating portion rotates in a state of being engaged with the striking portion, and
performs a striking operation of moving to the one side in the first direction by a biasing force of the biasing portion to strike the fastener when the engagement with the rotating portion is released, and
wherein the rotating portion includes
a plurality of rotating portion side engagement portions provided along a rotational direction of the rotating portion and that engage with the plurality of striking portion side engagement portions in the striking operation, and
an interference portion that does not interfere with the striking portion in a first striking operation in which all of the plurality of striking portion side engagement portions are engaged with the rotating portion side engagement portions and that interferes with the striking portion in a second striking operation in which some of the plurality of striking portion side engagement portions are not engaged with the rotating portion side engagement portions.

2. The working machine according to claim 1, wherein among the plurality of striking portion side engagement portions, the striking portion side engagement portion disposed closest to the other side in the first direction is engaged with the rotating portion side engagement portion in the first striking operation, and is not engaged with the rotating portion side engagement portion in the second striking operation.

3. The working machine according to claim 1, wherein the interference portion includes a first interference portion that does not interfere with the plurality of striking portion side engagement portions in the first striking operation and that interferes with the plurality of striking portion side engagement portions in the second striking operation.

4. The working machine according to claim 3, wherein a position of an outer peripheral portion of the first interference portion in a radial direction of the rotating portion is the same position as a position of an outer peripheral portion of the rotating portion side engagement portion or a position inward from the position of the outer peripheral portion of the rotating portion side engagement portion in the radial direction of the rotating portion.

5. The working machine according to claim 3, wherein the striking portion side engagement portion disposed closest to the one side in the first direction among the plurality of striking portion side engagement portions has a pressing surface capable of pressing the first interference portion toward the center of the rotating portion in the second striking operation.

6. The working machine according to claim 3, wherein the interference portion is provided between the rotating portion side engagement portions adjacent to each other in a rotational direction of the rotating portion, and is disposed at a position close to the rotating portion side engagement portion upstream in the rotational direction among the adjacent rotating portion side engagement portions.

7. The working machine according to claim 3, wherein the first interference portion includes one end of the interference portion and the other end positioned on a side opposite to the one end, and
wherein, in the rotating portion, the first interference portion is supported at both the one end and the other end.

8. The working machine according to claim 7, wherein each of the rotating portion side engagement portion and the first interference portion is a cylindrical pin, and a diameter of the first interference portion is smaller than a diameter of the rotating portion side engagement portion.

9. The working machine according to claim 3, wherein the rotating portion includes a plurality of composite engagement portions arranged in the rotational direction in which the rotating portion side engagement portion and the first interference portion are integrated.

10. The working machine according to claim 3, wherein the first interference portion is provided along with the plurality of rotating portion side engagement portions in a rotational direction of the rotating portion.

11. The working machine according to claim 1, wherein the striking portion is re-engaged with the rotating portion by rotation of the rotating portion after striking, and moves to the standby position to the other side in the first direction by further rotation of the rotating portion.

12. The working machine according to claim 1, wherein the interference portion includes a second interference portion that does not interfere with the plurality of striking portion side engagement portions in the first and second striking operations.

13. The working machine according to claim 12, wherein the second interference portion is disposed at a position different from the plurality of rotating portion side engagement portions in a radial direction of the rotating portion.

14. The working machine according to claim 12, wherein the striking portion includes a striking portion side interference portion that interferes with the second interference portion in the second striking operation.

15. The working machine according to claim 14, wherein the striking portion side interference portion is disposed on one side in the first direction with respect to the plurality of striking portion side engagement portions.

16. The working machine according to claim 14, wherein the striking portion side interference portion is disposed at a position separated from a rotation shaft of the rotating portion with respect to the plurality of striking portion side engagement portions in a second direction orthogonal to the first direction.

17. The working machine according to claim 12, wherein the second interference portion is disposed at a position different from the plurality of rotating portion side engagement portions in an axial direction of the rotating portion.

* * * * *